US012581524B2

(12) United States Patent
Peng et al.

(10) Patent No.: US 12,581,524 B2
(45) Date of Patent: Mar. 17, 2026

(54) INFORMATION SENDING METHOD AND APPARATUS

(71) Applicant: Huawei Technologies Co., Ltd., Shenzhen (CN)

(72) Inventors: Lan Peng, Shenzhen (CN); Xueru Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 429 days.

(21) Appl. No.: 18/005,656

(22) PCT Filed: Jul. 14, 2021

(86) PCT No.: PCT/CN2021/106166
§ 371 (c)(1),
(2) Date: Jan. 16, 2023

(87) PCT Pub. No.: WO2022/102565
PCT Pub. Date: Jan. 20, 2022

(65) Prior Publication Data
US 2023/0292355 A1     Sep. 14, 2023

(30) Foreign Application Priority Data

Jul. 17, 2020    (CN) .......................... 202010694431.8
Sep. 16, 2020    (CN) .......................... 202010975473.9

(51) Int. Cl.
*H04W 72/542*     (2023.01)
*H04W 72/02*      (2009.01)
*H04W 72/566*     (2023.01)

(52) U.S. Cl.
CPC ......... *H04W 72/542* (2023.01); *H04W 72/02* (2013.01); *H04W 72/566* (2023.01)

(58) Field of Classification Search
CPC .. H04W 72/542; H04W 72/566; H04W 72/02
See application file for complete search history.

(56) References Cited

U.S. PATENT DOCUMENTS 11,974,278 B2 *   4/2024   Yang ...................... H04W 4/08
2020/0022089 A1   1/2020   Guo
(Continued)

FOREIGN PATENT DOCUMENTS

CN         110139237 A    8/2019
CN         111130733 A    5/2020
(Continued)

*Primary Examiner* — Won Tae C Kim
(74) *Attorney, Agent, or Firm* — Slater Matsil, LLP

(57)                ABSTRACT

This application discloses an information sending method and an apparatus, and relate to the communication field. The method includes: A first terminal sends a first indication message to a second terminal, where the first indication message indicates the second terminal to report first information; the second terminal reports the first information to the first terminal according to the first indication message, where the first information indicates channel state information of a channel resource; the first terminal sends a second indication message to the second terminal, where the second indication message indicates information about a first resource set, the first resource set is determined by the first terminal based on the first information, and a resource in the first resource set is a resource for sidelink communication.

20 Claims, 14 Drawing Sheets

(56)                    References Cited

U.S. PATENT DOCUMENTS

2020/0033088  A1      1/2020   Nguyen
2020/0045655  A1*     2/2020   Joseph ................ H04W 56/001
2021/0050888  A1*     2/2021   Manolakos ........... H04L 5/0023
2022/0394678  A1*    12/2022   Zhang ................... H04W 72/02
2023/0081131  A1*     3/2023   Selvanesan ........... H04W 72/20
                                                                370/329
2023/0155758  A1*     5/2023   Park ...................... H04L 27/261
                                                                370/329

FOREIGN PATENT DOCUMENTS

CN          111277949  A      6/2020
WO          2015138282 A1     9/2015
WO          2019196829 A1    10/2019
WO          2020064553 A1     4/2020
WO          2020145803 A1     7/2020

* cited by examiner

| Synchronization (primary sidelink synchronization signal PSSS and secondary sidelink synchronization signal) |
| --- |

| Communication (resource allocation manners: centralized allocation in which a base station participates and resource allocation based on autonomous selection of a terminal) |
| --- |

A first terminal sends a first indication message to a second terminal ⟩ S601

The second terminal reports first information to the first terminal ⟩ S602

The first terminal sends a second indication message to the second terminal, where the second indication message indicates information of a first resource set ⟩ S603

| | Resource 1 | Resource 2 | Resource 3 | Resource 4 | Resource 5 |
|---|---|---|---|---|---|
| To-be-measured resource set S | 1 | 0 | 0 | 0 | 1 |

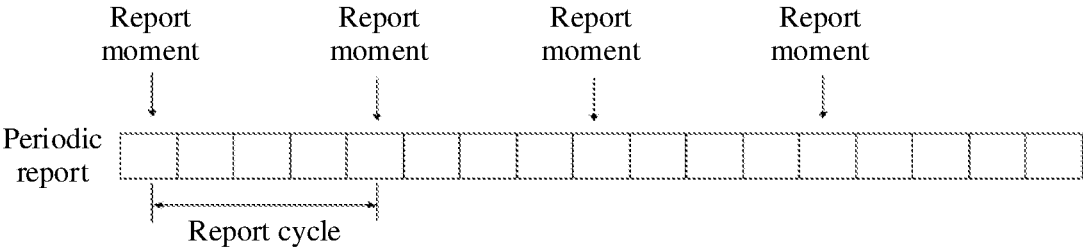
FIG. 7C
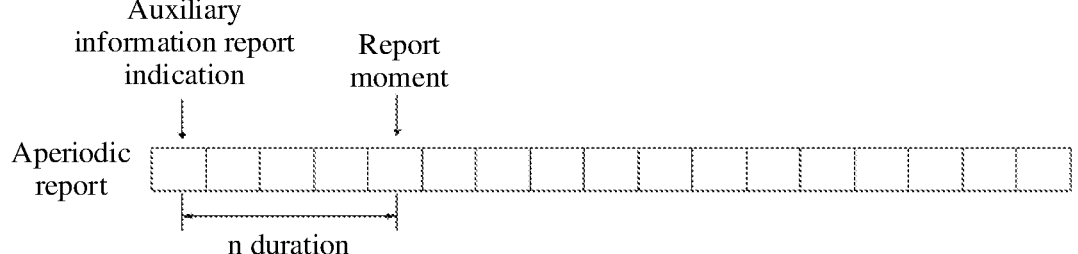
FIG. 7D
|  | Resource 1 | Resource 2 | Resource 3 | Resource 4 | Resource 5 |
|---|---|---|---|---|---|
| Second terminal 1 | 1 | 0 | 1 | 0 | 1 |
| Second terminal 2 |  | 1 | 1 | 0 | 1 |
| Second terminal 3 | 0 | 1 | 1 | 0 |  |
| Second terminal 4 |  | 1 | 1 | 1 | 1 |
FIG. 7E

| | Resource 1 | Resource 2 | Resource 3 | Resource 4 | Resource 5 |
|---|---|---|---|---|---|
| To-be-measured resource set S | −80 dBm | −85 dBm | −75 dBm | −70 dBm | −80 dBm |

| | Resource 1 | Resource 2 | Resource 3 | Resource 4 | Resource 5 |
|---|---|---|---|---|---|
| To-be-measured resource set S | 0 | 1 | 1 | 0 | 0 |

| Configuration sending unit | 1301 |
| Configuration receiving unit | 1302 |
| Measurement unit | 1303 |
| Auxiliary information report unit | 1304 |
| Available resource decision-making unit | 1305 |
| Available resource decision-making unit | 1306 |

INFORMATION SENDING METHOD AND APPARATUS

CROSS-REFERENCE TO RELATED APPLICATIONS

This application is a national stage of International Application No. PCT/CN2021/106166, filed on Jul. 14, 2021, which claims priority to Chinese Patent Application No. 202010694431.8, filed on Jul. 17, 2020 and Chinese Patent Application No. 202010975473.9, filed on Sep. 16, 2020. All of the aforementioned applications are hereby incorporated by reference in their entireties.

TECHNICAL FIELD

This application relates to the field of communication, and in particular, to an information sending method and an apparatus.

BACKGROUND

A sidelink (sidelink) connection technology is a technology used by terminal devices to directly communicate with each other on radio resources. The sidelink technology is an important branch of a cellular Internet of Things technology, and is first applied in a D2D (Device to Device, device to device) communication scenario. The sidelink technology creates a broad prospect for application of the Internet of Things, the Internet of Vehicles, and the like, and fundamentally changes a communication architecture and operation of a conventional cellular network. In the sidelink technology, there are two resource allocation manners. In one manner, resource allocation relies on a base station. In the other manner, resource allocation is based on autonomous selection by a terminal. When resource allocation is based on autonomous selection by the terminal, a resource conflict may occur because central control and allocation are not implemented in resource selection. Achieving appropriate and effective resource contention has been an important research topic.

SUMMARY

Embodiments of this application provide an information sending method and apparatus, so that a group member can report first information to a group header when a sidelink technology is used, and the group header determines a resource for sidelink communication based on the received first information, and sends the resource for sidelink communication to the group member. Therefore, a probability that a resource conflict occurs when a group of devices perform sidelink communication is reduced, and communication performance of the entire group is improved.

According to a first aspect, an embodiment of this application provides an information sending method applied to a wireless communication system, where the wireless communication system includes a first terminal and a second terminal, and there is one or more second terminals. The method includes:

The first terminal sends a first indication message to the second terminal, where the first indication message indicates the second terminal to report first information; the second terminal reports the first information to the first terminal according to the first indication message, where the first information indicates channel state information of a channel resource; and the first terminal sends a second indication message to the second terminal, where the second indication message indicates information about a first resource set, the first resource set is determined by the first terminal based on the first information, and a resource in the first resource set is a resource for sidelink communication.

In this method, the second terminal sends the first information to the first terminal, and the first terminal determines the first resource set based on the first information. The resource in the first resource set is the resource for sidelink communication. In this way, the resource for sidelink communication can be accurately determined, and a probability that a resource conflict occurs when a group of devices perform sidelink communication can be reduced.

In an implementation, at least one of the first terminal and the second terminal performs sidelink communication on the resource in the first resource set.

In an implementation, the channel state information of a channel resource is first-type state information, and the first-type state information indicates whether channel quality of the channel resource reaches a first threshold; or the channel state information of a channel resource is second-type state information, and the second-type state information is channel quality of the channel resource; or the channel state information of a channel resource is third-type state information, and the third-type state information indicates whether a bit error rate of the channel resource reaches a second threshold; and the channel quality includes reference signal received power RSRP, a signal to interference plus noise ratio SINR, or reference signal received quality RSRQ.

In an implementation, the first indication message includes an indication of a type of reported content, and the type of reported content is one or more of the first-type state information, the second-type state information, or the third-type state information.

In an implementation, that the first resource set is determined by the first terminal based on the first information includes:

The first terminal determines a second resource set based on second information, where the second information is a set obtained through measurement performed by the first terminal, the second resource set is determined by the first terminal from a fourth resource set, and a percentage of resources in the fourth resource set that are measured by the second terminal and whose measurement results reach a measurement threshold is greater than or equal to a first percentage, or a percentage of resources in the fourth resource set that are measured by the first terminal and the second terminal and whose measurement results reach a measurement threshold is greater than or equal to a first percentage, or the fourth resource set is a set obtained through measurement performed by the first terminal; and the first terminal determines a third resource set based on the first information and the second information, where a quantity of resources in the third resource set is a third quantity, and the first resource set includes the second resource set and the third resource set.

In this way, the first terminal first determines the second resource set based on the second information to ensure sufficient resources for the first terminal, and then determines the third resource set based on the first information and the second information to meet a resource requirement of the entire group.

In an implementation, when the type of reported content is the first-type state information or the second-type state information, the first information is a resource set obtained through measurement performed by the second terminal, and the third resource set is determined by the first terminal randomly or according to a principle prioritizing a traffic volume.

In an implementation, when the type of reported content is the third-type state information, the first information is an interference set obtained through measurement performed by the second terminal, and a method for determining the third resource set by the first terminal includes at least one of the following:

The first terminal arranges, based on traffic volumes of second terminals in descending order, interference sets obtained through measurement performed by the second terminals, and selects, according to the arrangement order, resources with the minimum interference in the interference sets as the resources in the third resource set;

or the first terminal calculates resource average interference based on the interference set obtained through measurement performed by the second terminal, and selects resources that are of the third quantity and whose resource average interference is the minimum as the resources in the third resource set;

or the first terminal converts a resource interference value into spectral efficiency based on the interference set obtained through measurement performed by the second terminal, obtains a transmission period of a resource through calculation performed based on a traffic volume of the second terminal, and selects resources that are of the third quantity and whose transmission periods are the minimum as resources in the third resource set.

In an implementation, the first indication message includes an indication of a to-be-measured resource set, and the to-be-measured resource set indicates a position of a channel resource measured by the second terminal.

In an implementation, the wireless communication system further includes a third terminal, the third terminal belongs to another group, and the first information includes information about interference from the third terminal to a to-be-measured resource in the to-be-measured resource set. In this way, when determining the first resource set, the first terminal considers interference to the to-be-measured resource from an adjacent terminal in another group, so that a determined resource for sidelink communication is accurate.

In an implementation, the first indication message includes an indication of a sending mechanism for the first information, and the sending mechanism for the first information includes reporting the first information on an autonomously selected resource or reporting the first information on a reserved resource.

In an implementation, the first indication message includes an indication of a report occasion, and the report occasion includes periodic report or aperiodic report.

In an implementation, that the first terminal sends a first indication message to the second terminal includes: The first terminal measures a distance between the first terminal and the second terminal, and when the distance changes and reaches a first distance threshold, the first terminal sends the first indication message to the second terminal. In this way, untimely report of the first information caused by a great change in a position of the second terminal can be prevented.

In an implementation, that the second terminal receives the first indication message and reports the first information to the first terminal includes:

The second terminal receives the first indication message, and reports the first information to the first terminal by using a radio resource control RRC message, a media control element MCE message, or a sidelink control indicator SCI message.

In an implementation, that the first resource set is determined by the first terminal based on the first information includes:

the first resource set is determined by the first terminal based on the received first information and a received available resource state sent by a fourth terminal, where the fourth terminal is a group header of another group; or the first resource set is directly determined by the first terminal based on the received first information.

In an implementation, that the first terminal sends a second indication message to the second terminal includes:

The first terminal sends the second indication message to the second terminal by using a radio resource control RRC message, a media control element MCE message, or a sidelink control indicator SCI message.

According to another aspect, an embodiment of this application provides an information sending method. The method is applied to a first terminal, where the first terminal is included in a wireless communication system, and the wireless communication system includes one or more second terminals. The method includes:

The first terminal sends a first indication message to the second terminal, where the first indication message indicates the second terminal to report first information;

the first terminal receives the first information reported by the second terminal, where the first information indicates channel state information of a channel resource; and the first terminal sends a second indication message to the second terminal, where the second indication message indicates information about a first resource set, the first resource set is determined by the first terminal based on the first information, and a resource in the first resource set is a resource for sidelink communication.

In this method, the first terminal determines the first resource set based on the first information sent by the second terminal. The resource in the first resource set is the resource for sidelink communication. In this way, the resource for sidelink communication can be accurately determined, and a probability that a resource conflict occurs when a group of devices perform sidelink communication can be reduced.

In an implementation, the channel state information of a channel resource is first-type state information, and the first-type state information indicates whether channel quality of the channel resource reaches a first threshold; or the channel state information of a channel resource is second-type state information, and the second-type state information is channel quality of the channel resource; or the channel state information of a channel resource is third-type state information, and the third-type state information indicates whether a bit error rate of the channel resource reaches a second threshold; and the channel quality includes reference signal received power RSRP, a signal to interference plus noise ratio SINR, or reference signal received quality RSRQ.

In an implementation, the first indication message includes an indication of a type of reported content, and the type of reported content is one or more of the first-type state information, the second-type state information, or the third-type state information.

In an implementation, that the first resource set is determined by the first terminal based on the first information includes:

The first terminal determines a second resource set based on second information, where the second information is a set obtained through measurement performed by the first terminal, the second resource set is determined by the first terminal from a fourth resource set, and a percentage of resources in the fourth resource set that are measured by the second terminal and whose measurement results reach a measurement threshold is greater than or equal to a first percentage, or the percentage of the resources in the fourth resource set that are measured by the first terminal and the second terminal and whose measurement results reach a measurement threshold is greater than or equal to a first percentage, or the fourth resource set is a set obtained through measurement performed by the first terminal; and the first terminal determines a third resource set based on the first information and the second information, where a quantity of resources in the third resource set is a third quantity, and the first resource set includes the second resource set and the third resource set.

In this way, the first terminal first determines the second resource set based on the second information to ensure sufficient resources for the first terminal, and then determines the third resource set based on the first information and the second information to meet a resource requirement of the entire group.

In an implementation, when the type of reported content is the first-type state information or the second-type state information, the first information is a resource set obtained through measurement performed by the second terminal, and the third resource set is determined by the first terminal randomly or according to a principle prioritizing a traffic volume.

In an implementation, when the type of reported content is the third-type state information, the first information is an interference set obtained through measurement performed by the second terminal, and a method for determining the third resource set by the first terminal includes at least one of the following.

The first terminal arranges, based on traffic volumes of second terminals in descending order, interference sets obtained through measurement performed by the second terminals, and selects, according to the arrangement order, resources with the minimum interference in the interference sets as the resources in the third resource set;
or
the first terminal calculates resource average interference based on the interference set obtained through measurement performed by the second terminal, and selects resources that are of the third quantity and whose resource average interference is the minimum as the resources in the third resource set;
or
the first terminal converts a resource interference value into spectral efficiency based on the interference set obtained through measurement performed by the second terminal, obtains a transmission period of a resource through calculation performed based on a traffic volume of the second terminal, and selects resources that are of the third quantity and whose transmission periods are the minimum as resources in the third resource set.

In an implementation, the first indication message includes an indication of a to-be-measured resource set, and the to-be-measured resource set indicates a position of a channel resource measured by the second terminal.

In an implementation, the wireless communication system further includes a third terminal, the third terminal belongs to another group, and the first information includes information about interference from the third terminal to a to-be-measured resource in the to-be-measured resource set. In this way, when determining the resource for sidelink communication, the first terminal considers interference to the to-be-measured resource from an adjacent terminal in another group, so that a determined resource for sidelink communication is accurate.

In an implementation, the first indication message includes an indication of a sending mechanism for the first information, and the sending mechanism for the first information includes reporting the first information on an autonomously selected resource or reporting the first information on a reserved resource.

In an implementation, the first indication message includes an indication of a report occasion, and the report occasion includes periodic report or aperiodic report.

In an implementation, that the first terminal sends a first indication message to the second terminal includes: The first terminal measures a distance between the first terminal and the second terminal, and when the distance changes and reaches a first distance threshold, the first terminal sends the first indication message to the second terminal. In this way, untimely report of the first information caused by a great change in a position of the second terminal can be prevented.

In an implementation, that the first resource set is determined by the first terminal based on the first information includes:

The first resource set is determined by the first terminal based on the received first information and a received available resource state sent by a fourth terminal, where the fourth terminal is a group header of another group; or the first resource set is directly determined by the first terminal based on the received first information.

In an implementation, that the first terminal sends a second indication message to the second terminal includes:

The first terminal sends the second indication message to the second terminal by using a radio resource control RRC message, a media control element MCE message, or a sidelink control indicator SCI message.

According to still another aspect, an embodiment of this application provides an information sending method, applied to a wireless communication system, where the wireless communication system includes a first terminal and a second terminal, and there is one or more second terminals. The method includes:

The second terminal sends a group joining application to the first terminal, and in response to a received application approval message sent by the first terminal, joins a first group to become a member in the first group;

the second terminal reports first information to the first terminal, where the first information indicates channel state information of a channel resource; and the second terminal receives a second indication message sent by the first terminal, where the second indication message indicates information about a first resource set, the first resource set is determined by the first terminal based on the first information, and a resource in the first resource set is a resource for sidelink communication.

In this method, the second terminal sends the first information to the first terminal to assist the first terminal in selecting the first resource set, and the resource in the first resource set is a resource for sidelink communication. In this way, the resource for sidelink communication that is received by the second terminal and that is determined by the first terminal can be accurate, and a probability that a resource conflict occurs when a group of devices perform sidelink communication can be reduced.

In an implementation, the second terminal performs sidelink communication on the resource in the first resource set.

In an implementation, that the second terminal joins a first group to become a member in the first group includes:

The second terminal detects the first group, and receives a first operation for joining the first group to become the member of the first group, where the first operation includes user selection; or the second terminal detects the first group, and autonomously joins the first group to become the member of the first group.

In an implementation, before that the second terminal reports first information to the first terminal, the method further includes:

The first terminal receives a first indication message of the second terminal, where the first indication message indicates the second terminal to report the first information.

In an implementation, the channel state information of a channel resource is first-type state information, and the first-type state information indicates whether channel quality of the channel resource reaches a first threshold; or the channel state information of a channel resource is second-type state information, and the second-type state information is channel quality of the channel resource; or the channel state information of a channel resource is third-type state information, and the third-type state information indicates whether a bit error rate of the channel resource reaches a second threshold; and the channel quality includes reference signal received power RSRP, a signal to interference plus noise ratio SINR, or reference signal received quality RSRQ.

In an implementation, the first indication message includes an indication of a type of reported content, and the type of reported content is one or more of the first-type state information, the second-type state information, or the third-type state information.

In an implementation, that the first resource set is determined by the first terminal based on the first information includes:

The first terminal determines a second resource set based on second information, where the second information is a set obtained through measurement performed by the first terminal, the second resource set is determined by the first terminal from a fourth resource set, and a percentage of resources in the fourth resource set that are measured by the second terminal and whose measurement results reach a measurement threshold is greater than or equal to a first percentage, or a percentage of resources in the fourth resource set that are measured by the first terminal and the second terminal and whose measurement results reach a measurement threshold is greater than or equal to a first percentage, or the fourth resource set is a set obtained through measurement performed by the first terminal; and the first terminal determines a third resource set based on the first information and the second information, where a quantity of resources in the third resource set is a third quantity, and the first resource set includes the second resource set and the third resource set.

In this way, the first terminal first determines the second resource set based on the second information to ensure sufficient resources for the first terminal, and then determines the third resource set based on the first information and the second information to meet a resource requirement of the entire group.

In an implementation, when the type of reported content is the first-type state information or the second-type state information, the first information is a resource set obtained through measurement performed by the second terminal, and the third resource set is determined by the first terminal randomly or according to a principle prioritizing a traffic volume.

In an implementation, when the type of reported content is the third-type state information, the first information is an interference set obtained through measurement performed by the second terminal, and a method for determining the third resource set by the first terminal includes at least one of the following:

The first terminal arranges, based on traffic volumes of second terminals in descending order, interference sets obtained through measurement performed by the second terminals, and selects, according to the arrangement order, resources with the minimum interference in the interference sets as the resources in the third resource set;

or the first terminal calculates resource average interference based on the interference set obtained through measurement performed by the second terminal, and selects resources that are of the third quantity and whose resource average interference is the minimum as the resources in the third resource set;

or the first terminal converts a resource interference value into spectral efficiency based on the interference set obtained through measurement performed by the second terminal, obtains a transmission period of a resource through calculation performed based on a traffic volume of the second terminal, and selects resources that are of the third quantity and whose transmission periods are the minimum as resources in the third resource set.

In an implementation, the first indication message includes an indication of a to-be-measured resource set, and the to-be-measured resource set indicates a position of a channel resource measured by the second terminal.

In an implementation, the wireless communication system further includes a third terminal, the third terminal belongs to another group, and the first information includes information about interference from the third terminal to a to-be-measured resource in the to-be-measured resource set. In this way, when determining the resource for sidelink communication, the first terminal considers interference to the to-be-measured resource from an adjacent terminal in another group, so that a determined resource for sidelink communication is accurate.

In an implementation, the first indication message includes an indication of a sending mechanism for the first information, and the sending mechanism for the first information includes reporting the first information on an autonomously selected resource or reporting the first information on a reserved resource.

In an implementation, the first indication message includes an indication of a report occasion, and the report occasion includes periodic report or aperiodic report.

In an implementation, that the first terminal reports first information to the second terminal includes:

The first terminal measures a distance between the first terminal and the second terminal, and when the distance changes and reaches a second distance threshold, the first terminal aperiodically reports the first information to the second terminal. In this way, untimely report of the first information caused by a great change in a position of the second terminal can be prevented.

In an implementation, that the first terminal reports first information to the second terminal includes:

The first terminal reports the first information to the second terminal by using a radio resource control RRC message, a media control element MCE message, or a sidelink control indicator SCI message.

According to yet another aspect, an embodiment of this application provides an information sending method applied to a wireless communication system, where the wireless communication system includes a first terminal, a second terminal, and a third terminal, the first terminal and the second terminal belong to a same communication group, the first terminal is a group header, and the second terminal is a group member. The method includes:

The first terminal sends a first indication message to the second terminal, where the first indication message indicates the second terminal to report first information, and the first indication message includes an indication of a to-be-measure resource set;

the second terminal reports the first information to the first terminal according to the first indication message, where the first information includes information about interference from the third terminal to a to-be-measured resource in the to-be-measured resources set; and the first terminal sends a second indication message to the second terminal, where the second indication message indicates information about a first resource set, a resource in the first resource set is a resource for sidelink communication, and resources in the first resource set do not include a resource that is in the to-be-measured resource set and on which interference from the third terminal meets a preset condition.

According to this method, the second terminal reports the first information to the first terminal, where the first information includes information about interference on the to-be-determined resource from a terminal in another group. In this way, when determining the resource for sidelink communication, the first terminal considers interference from the terminal in another group, so that a determined resource for sidelink communication is accurate, and a probability that a resource conflict occurs when a group of devices perform sidelink communication can be reduced.

In an implementation, at least one of the first terminal and the second terminal performs sidelink communication on the resource in the first resource set.

In an implementation, the third terminal does not belong to the communication group including the first terminal and the second terminal.

In an implementation, that resources in the first resource set do not include a resource that is in the to-be-measured resource set and on which interference from the third terminal meets a preset condition includes: The resources in the first resource set do not include a resource that is in the to-be-measured resource set and whose information about interference from the third terminal reaches an interference threshold; or the resources in the first resource set do not include a resource that is in the to-be-measured resource set and whose information about interference from the third terminal, the second terminal, and the first terminal reaches the interference threshold.

According to a further aspect, an embodiment of this application provides a communication apparatus. The communication apparatus includes a processor. The processor is configured to: be coupled to a memory, read instructions in the memory, and enable, based on the instructions, the communication apparatus to perform the method in the first aspect.

In an implementation, the communication apparatus is a terminal or a chip.

According to a still further aspect, an embodiment of this application provides a computer program product including instructions. When the computer program product is run on a terminal, the terminal is enabled to perform the method in the first aspect.

According to a still yet further aspect, an embodiment of this application provides a computer-readable storage medium including instructions. When the instructions are run on a terminal, the terminal is enabled to perform the method in the first aspect.

According to an even yet another aspect, this application provides an information sending apparatus. The information sending apparatus is disposed in a terminal and includes: a configuration sending unit, configured to send a first indication message to a group member device when the apparatus is used as a group header; a configuration receiving unit, configured to: when the apparatus is used as a group member device, receive a first indication message sent by a group header; a measurement unit, configured to measure a resource when the apparatus is used as a group member device or a group header; an auxiliary information report unit, configured to generate first information and report the first information to a group header when the apparatus is used as a group member device; an available resource decision-making unit, configured to: when the apparatus is used as a group header, perform decision-making, based on first information reported by a group member device and measurement information of the apparatus, to obtain a resource for sidelink communication; and an available resource configuration unit, configured to configure a resource for sidelink communication to a group member device when the apparatus is used as a group header.

BRIEF DESCRIPTION OF THE DRAWINGS

FIG. 7A to FIG. 7E are a flowchart and schematic diagrams of an information sending method for reporting a first-type state information according to an embodiment of this application;

DETAILED DESCRIPTION OF ILLUSTRATIVE EMBODIMENTS

To make objectives, technical solutions, and advantages of the present invention clearer, the following describes implementations of this present invention in detail with reference to accompanying drawings.

"A plurality of" in this application refers to two or more than two. The term "and/or" describes an association relationship between associated objects and represents that three relationships may exist. For example, A and/or B may represent the following three cases: Only A exists, both A and B exist, and only B exists. The character "/" usually indicates an "or" relationship between associated objects.

Figures 1, 2:
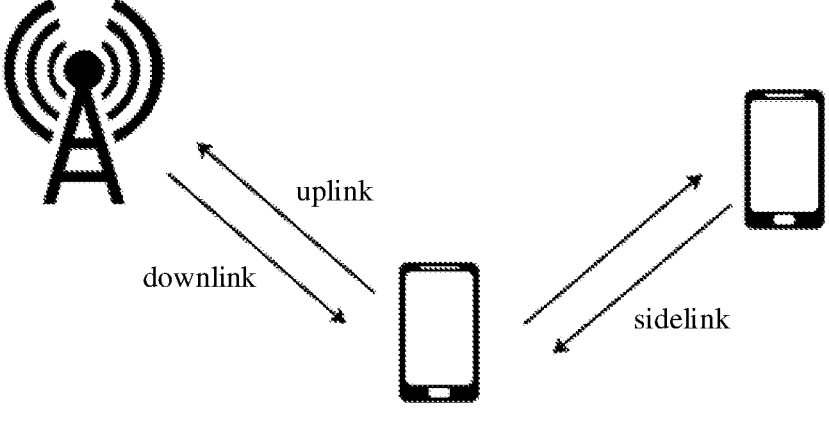
FIG. 1 is a schematic diagram of communication links in a mobile communication network.
FIG. 2 is a schematic diagram of a communication process in a sidelink technology.

With development of wireless communication technologies, a mobile communication network gradually evolves to a 5G NR (New Radio, new radio) system. In the 5G NR system, a sidelink (sidelink) technology is introduced. To be specific, terminal devices can directly communicate by using radio resources. As shown in FIG. 1, a sidelink (sidelink) is different from an uplink (uplink) and a downlink (downlink) between a terminal device and a base station. The sidelink is a link between terminal devices, and corresponds to a PC5 interface.

Similar to a sidelink technology in a 4G LTE (Long Term Evolution, long term evolution) system, the sidelink technology in the NR system can be applied to scenarios such as V2X (Vehicle to Everything, vehicle to everything). A PSCCH (Physical Sidelink Control Channel, physical sidelink control channel), a PSSCH (Physical Sidelink Shared Channel, physical sidelink shared channel), a PSBCH (Physical Sidelink Broadcast Channel, physical sidelink broadcast channel), and a PSFCH (Physical Sidelink Feedback Channel, physical sidelink feedback channel) are main sidelink physical channels in the NR system. The first three physical channels are used in the sidelink technology of the LTE system, and the PSFCH is a physical channel newly introduced in the sidelink technology of the NR system to support HARQ (Hybrid Automatic Repeat Request, hybrid automatic repeat request) transmission. The PSSCH transmits sidelink data information. The PSCCH mainly transmits sidelink control information, that is, transmits a sidelink control information (Sidelink Control Information, SCI) message. In addition, there are two synchronization signals: a primary sidelink synchronization signal (Primary Sidelink Synchronization Signal, PSSS) and a secondary sidelink synchronization signal (Secondary Sidelink Synchronization Signal).

The sidelink is first introduced in the LTE system, and is mainly applied to D2D (Device to Device, device to device) communication technologies. A main purpose is to ensure effective public safety communication (Public Safety Communication). The concept of V2X (Vehicle to Everything, vehicle to everything) is then introduced into the LTE system, and the sidelink is also a part of V2X standardization. The sidelink is defined as a communication mode in which direct proximity-based communication between terminal devices is implemented through a PC5 interface. According to the latest release of 3GPP (3rd Generation Partnership Project, 3rd generation partnership project), sidelink resource allocation that is based on air interface assistance and PC5 interface management is the next research priority. The research helps meet communication performance requirements of V2X in the NR system such as a latency and reliability. This research is of great significance to a communication scenario in which a user can autonomously select a resource when the user can perform V2X communication only through a sidelink.

Figures 3A, 3B, 3C, 3D:
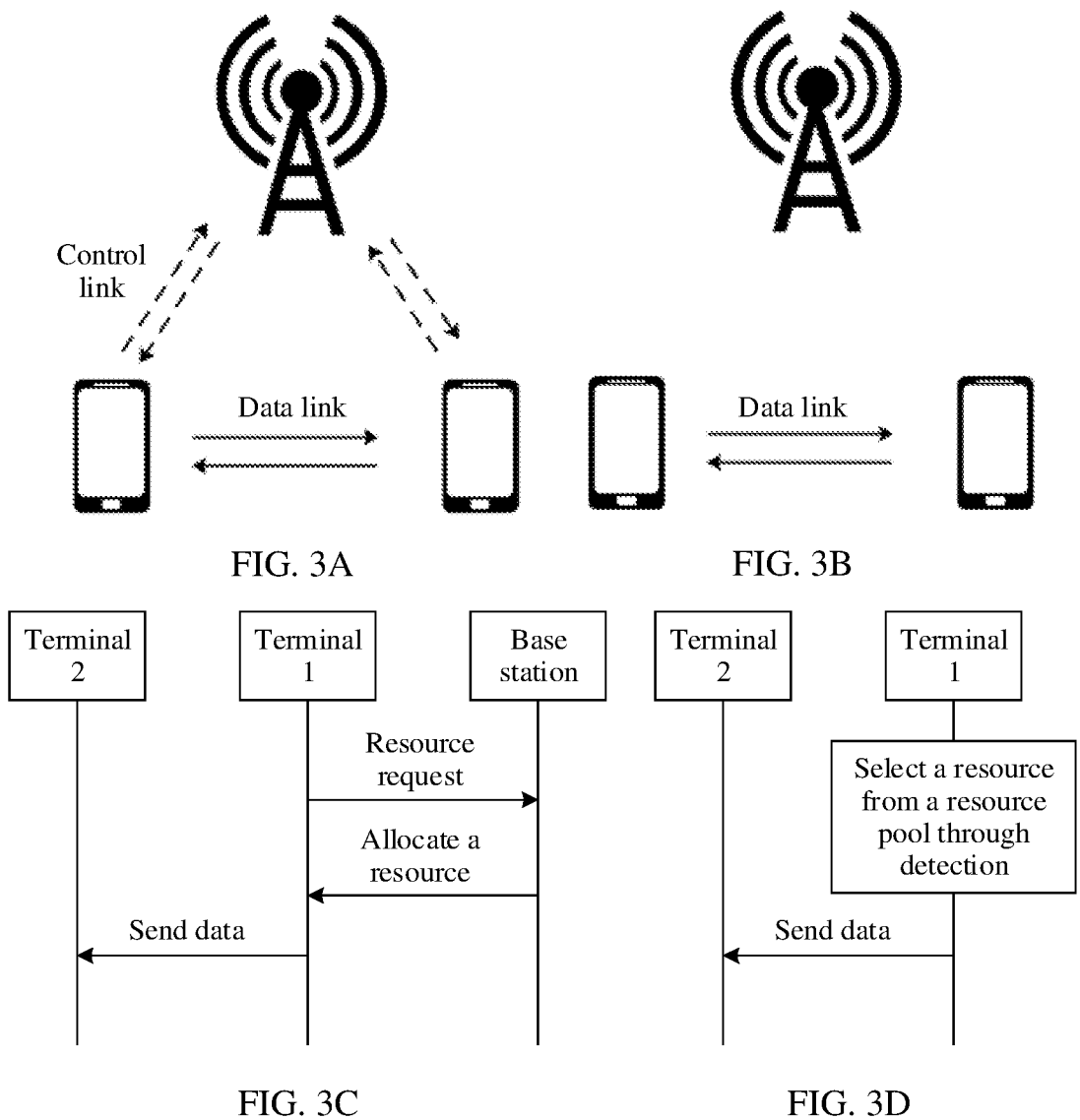
FIG. 3A and FIG. 3B are schematic diagrams of two resource allocation manners for a sidelink technology.
FIG. 3C and FIG. 3D are flowcharts of two resource allocation manners for a sidelink technology.

A sidelink communication process is shown in FIG. 2, and is divided into two parts: synchronization and communication. In the synchronization process, to enable all terminal devices to enter a synchronization state, currently, there are two sidelink synchronization procedures: a synchronization procedure based on GNSS (Global Navigation Satellite System, global navigation satellite system) and a synchronization procedure based on a base station. In a communication process, there are two resource allocation manners. FIG. 3A shows a resource allocation manner in which a base station participates. In this resource allocation manner, there is a control link between a base station and a terminal device. FIG. 3B shows a manner in which resource allocation is based on autonomous selection of a terminal. In this resource allocation manner, there are no control links between a base station and a terminal device.

FIG. 3C provides a specific procedure of the resource allocation manner in which a base station participates. When a terminal 1 needs to send data, the terminal 1 sends a resource request to a base station. After receiving the resource request, the base station sends an allocated resource to the terminal 1 by using a DCI (Downlink Control Indicator, downlink control indicator). After receiving the DCI message, the terminal 1 sends the data to a terminal 2 on a resource indicated in the DCI message. It can be learned from the foregoing procedure that, according to the resource allocation manner in which the base station participates, the sidelink resource for the terminal is allocated by the base station. Therefore, a resource conflict usually does not occur when the resource allocation manner shown in FIG. 3C is applied.

FIG. 3D shows a specific procedure of the allocation manner in which a terminal autonomously selects a resource. When a terminal 1 needs to send data, the terminal 1 first performs resource sensing (Resource Sensing). To be specific, the terminal 1 measures all resources in a resource pool, and then selects a group of resources from the resource pool to send the data. There are two scenarios of resource pool configuration. In one scenario, a terminal is in a network coverage area of a base station, and the resource pool configuration may be obtained from a system message of the base station. In another scenario, the terminal is not in the network coverage area of the base station, and resource pool configuration is preconfigured. It can be learned from the foregoing procedure that according to the manner in which resource allocation is based on autonomous selection of the terminal, resource selection by the terminal resource is completely autonomous. Therefore, a resource conflict may occur when the resource allocation manner shown in FIG. 3D is applied. However, because the terminal does not need to apply to the base station for a resource, signaling overheads and a data transmission latency can be reduced. In addition, the manner in which resource allocation is based on autonomous selection of a terminal is applicable to a scenario in which a terminal is not in a network coverage area of a base station, or network coverage of the base station is poor.

Figure 3E:
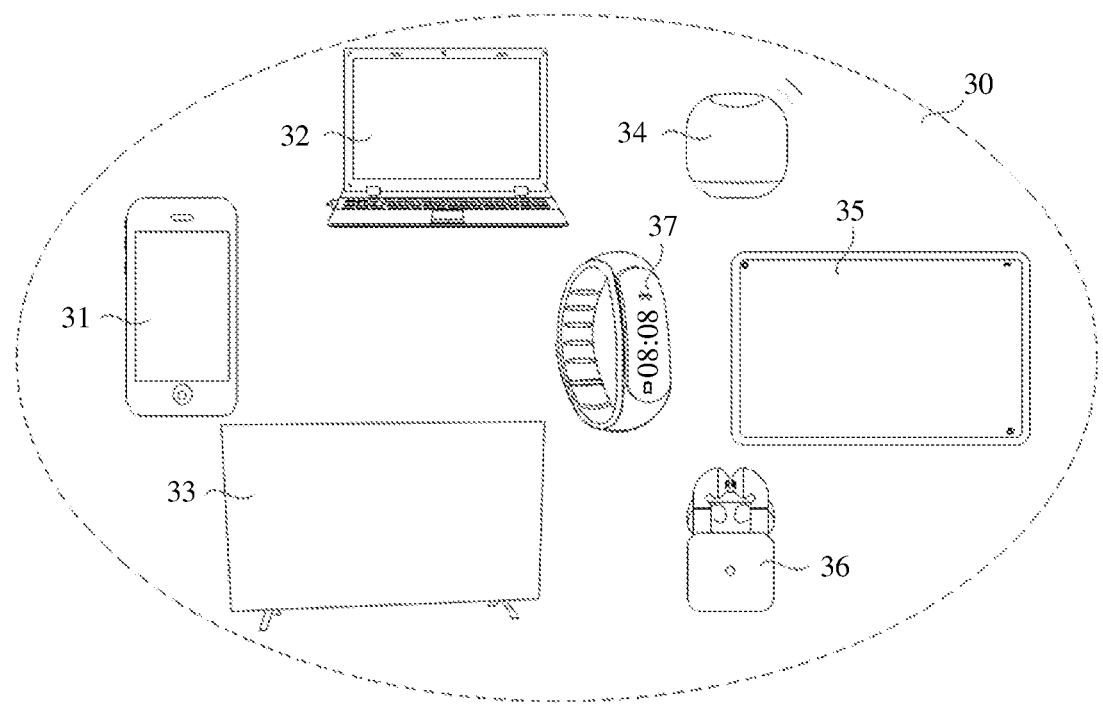
FIG. 3E is a schematic diagram of a typical home scenario in which a sidelink technology is used.
Figure 3F:
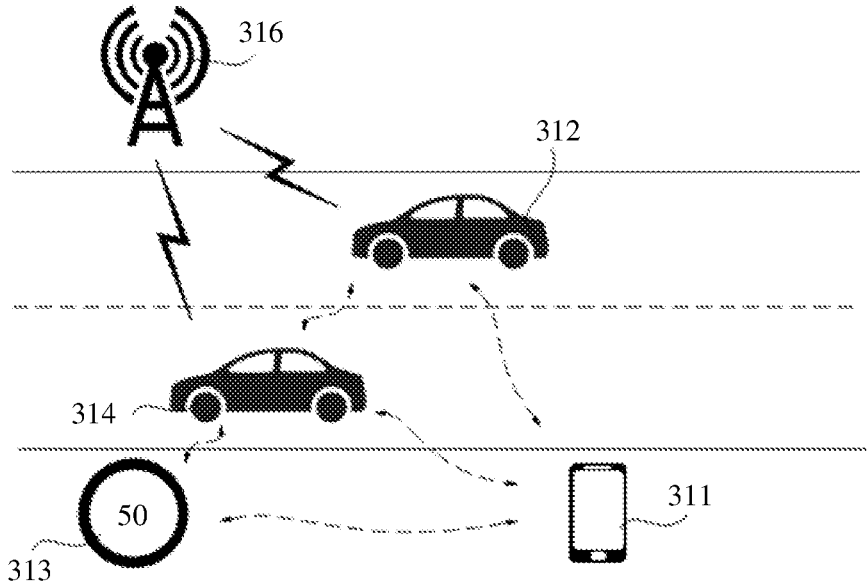
FIG. 3F is a schematic diagram of a typical vehicle platooning scenario in which a sidelink technology is used.

The sidelink technology can be applied in a plurality of scenarios, including typical application scenarios such as a home scenario, a meeting room scenario, a multiplayer gaming scenario, and a vehicle platooning scenario. Each application scenario includes a plurality of terminals. For example, in the home scenario, terminal devices such as a mobile phone, a television, a PC, a tablet, a stereo, a band, and a headset are included; in the meeting room scenario, terminal devices such as a large screen, a PC, a mobile phone, and a tablet are included; in the multiplayer gaming scenario, a plurality of gaming terminals are included; and the vehicle platooning scenario includes a plurality of moving vehicles, pedestrians, and roadside units RSUs. FIG. 3E shows a typical home scenario 30 in which the sidelink technology is used. The scenario includes a mobile phone 31, a PC 32, a television 33, a sound box 34, a tablet 35, a headset 36, and a band 37. The devices can directly communicate with each other through a sidelink. FIG. 3F shows a typical vehicle platooning scenario in which the sidelink technology is used. The scenario includes a pedestrian terminal device 311, a vehicle 312, a roadside unit RSU 313, a vehicle 314, and a base station 316. The devices can communicate with each other. Communication between the vehicle 312 and the vehicle 314 is referred to as V2V (Vehicle to Vehicle), communication between the vehicle 314 and the roadside unit RSU 313 is referred to as V2I (Vehicle to Infrastructure), communication between the vehicle 314 and the pedestrian terminal device 311 is referred to as V2P (Vehicle to Pedestrian), and communication between the vehicle 314 and the base station 316 is referred to as V2N (Vehicle to Network).

For the foregoing typical application scenarios, in the sidelink technology, a mechanism in which a group (Group) is used as the unit becomes a research focus, where the group is also referred to as a communication group. The mechanism in which a group is used as the unit has many advantages. Specifically, in a heavy-load scenario, if all pieces of user equipment independently contend for resources, there is a high probability that a resource conflict occurs. If a group header coordinates resource allocation, the probability that the resource conflict occurs can be greatly reduced. Coarse-grained resource negotiation is performed among groups, and resource allocation in a group is performed by a group header. In this way, resource utilization efficiency can be improved. In addition, because information exchange with the base station is reduced, an air interface latency can be reduced.

Figure 4A:
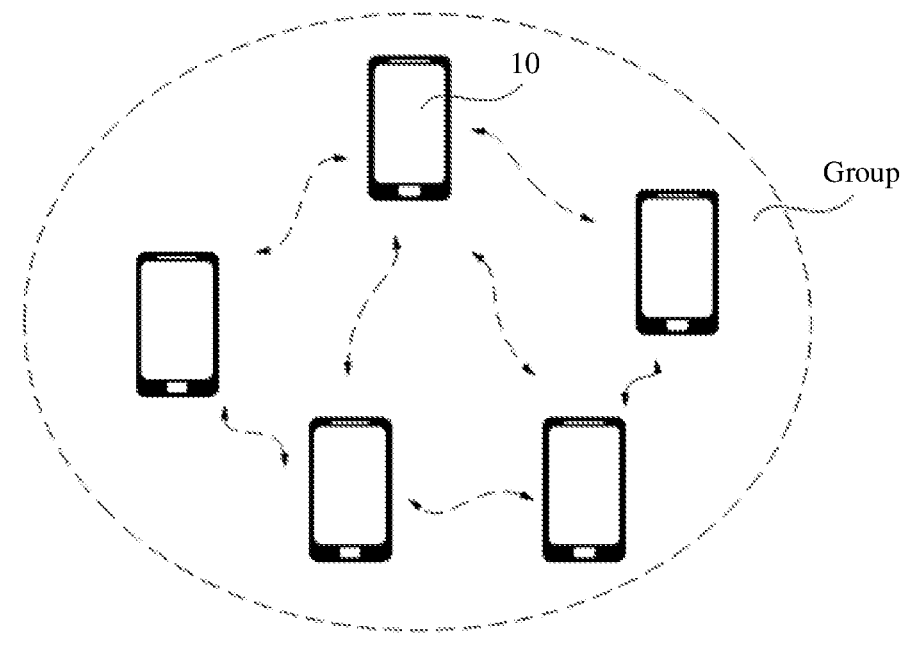
FIG. 4A is a schematic diagram of an application scenario according to an embodiment of this application.

FIG. 4A shows an application scenario of an embodiment of this application. In this scenario, a plurality of terminals form a group to improve communication efficiency. A terminal 10 is a group header. The group header may also be referred to as a group header terminal or a group header device. The group header can implement some functions of a base station to achieve unified management over the entire group. A terminal is a device that provides voice/data connectivity for a user, for example, a handheld device or an in-vehicle device that has a wireless connection function. The terminal may also be referred to as user equipment (User Equipment, UE), an access terminal (Access Terminal), a user unit (User Unit), a user station (User Station), a mobile station (Mobile Station), a remote station (Remote Station), a remote terminal (Remote Terminal), mobile equipment (Mobile Equipment), a user terminal (User Terminal), wireless telecom equipment (Wireless Telecom Equipment), a user agent (User Agent), user equipment (User Equipment) or a user apparatus. The terminal may be a station (Station, STA) in a wireless local area network (Wireless Local Area Network, WLAN), a cellular phone, a cordless phone, a session initiation protocol (Session Initiation Protocol, SIP) phone, a wireless local loop (Wireless Local Loop, WLL) station, a personal digital assistant (Personal Digital Assistant, PDA) device, a handheld device having a wireless communication function, a computing device or another processing device connected to a wireless modem, an in-vehicle device, a wearable device, a terminal in a next generation communication system (for example, a fifth-generation (Fifth-Generation, 5G) communication network), a terminal in a future evolved public land mobile network (Public Land Mobile Network, PLMN), or the like. 5G is also referred to as new radio (New Radio, NR). In a possible application scenario of this application, the terminal is a terminal that usually works on the ground, for example, an in-vehicle device. In this application, for ease of description, a chip deployed in the foregoing device may also be referred to as a terminal.

As an example, in embodiments of this application, the terminal may alternatively be a wearable device. The wearable device may alternatively be referred to as intelligent wearable device, and is a generic term for wearable devices such as glasses, gloves, watches, clothes, and shoes that are developed based on intelligent design of daily wearing by using wearable technologies. The wearable device is a portable device that can be directly worn on a body or integrated into a piece of clothing or an accessory of a user. The wearable device is a hardware device, and implements powerful functions through software support, data exchange, and cloud interaction. In a broad sense, intelligent wearable devices include full-featured and large-size devices that can implement complete or partial functions without depending on smartphones, for example, smart watches or smart glasses, and include devices that focus only on a specific type of application and need to be used together with another device such as a smartphone, for example, various smart bands and smart jewelry used for vital sign monitoring.

In terms of a product form, the terminal 10 serving as the group header in FIG. 4A is a type of terminal. However, the terminal 10 can only implement some functions of a base station, to be specific, implement a central control function and configure a resource for another terminal. In FIG. 4A, the terminal 10 serves as the group header, and other terminals are group members, where the group member may also be referred to as a group member terminal or a group member device.

In the sidelink technology, operation of a group-based mechanism requires a complete process mechanism. Key processes and technologies include group establishment, group header selection, group maintenance, inter-group resource contention, intra-group resource allocation, and the like.

Figures 4B, 4C:
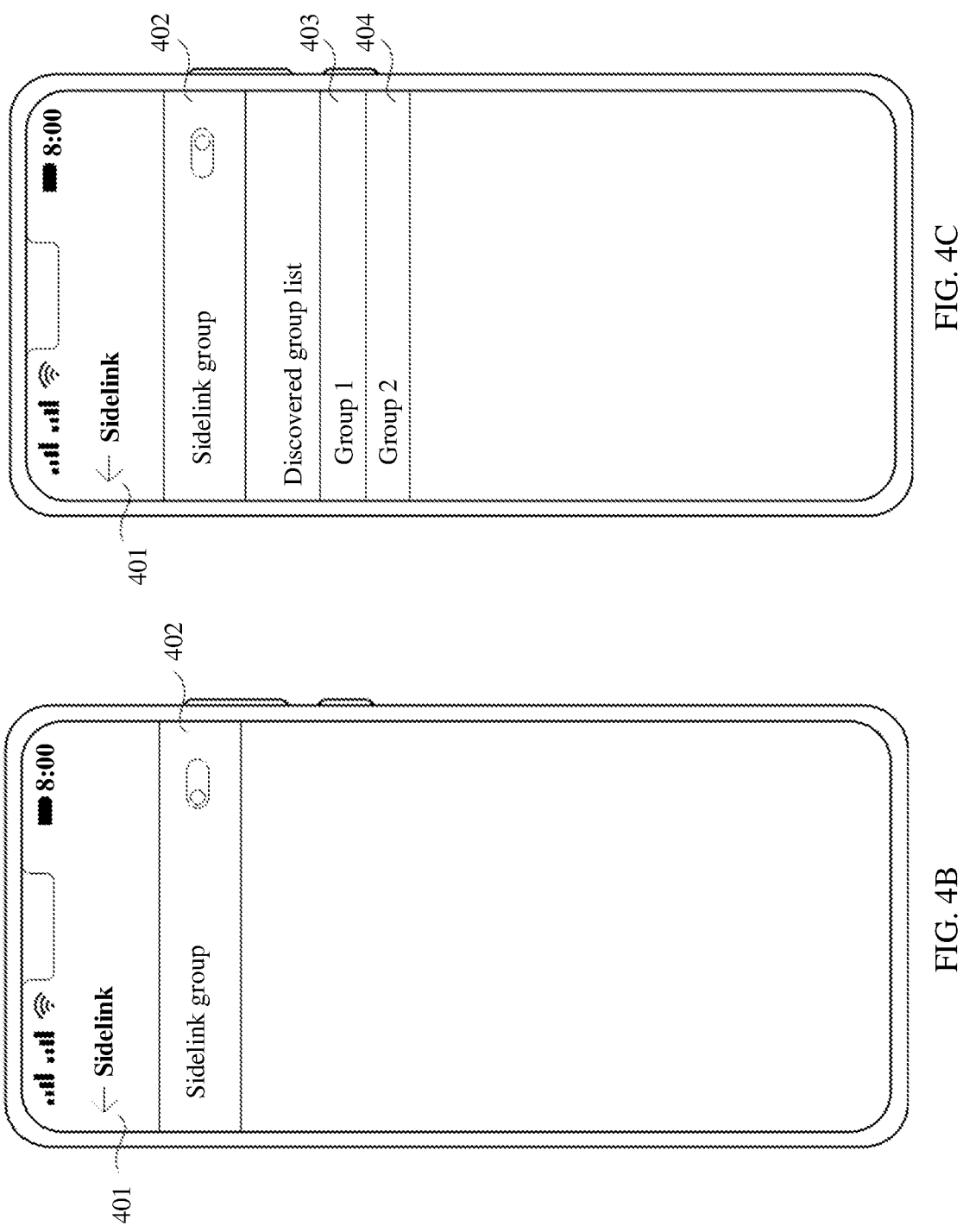
FIG. 4B and FIG. 4C are a schematic diagram of enabling a sidelink function by a terminal.

In a possible implementation, the terminal may accept a user setting to enable a sidelink group function, which is a function of a third-party application of the terminal or a system application of the terminal. As shown in FIG. 4B, on a sidelink setting page 401 of the terminal, a user may enable a group function by turning on a switch 402 of the sidelink group. As shown in FIG. 4C, the terminal accepts the user operation, and turns on the sidelink group switch. In this case, the terminal finds that there are two groups around, which are a Group 1 and a Group 2. The terminal may accept user selection to join a group, or the terminal may autonomously perform selection to join a group. In this way, the user can decide whether to enable the group function and select a group the terminal is to join. Consequently, terminal security and user experience are enhanced.

Embodiments of this application mainly relate to intergroup resource contention in the sidelink technology. In a sidelink technology applying the group-based mechanism, a group resource is contended for with a group being a unit, or a resource is independently contended for with a terminal device being a unit. For a contention mode in which the unit is group, resources for groups may be orthogonal to each other, or may overlap. In contention, the group header wins a resource for the entire group among resources for groups. When two group headers are close and selected resources overlap, signal interference is strong on the overlapping resources. Therefore, two group headers that are close avoid selecting overlapping resources, to improve a probability of successful signal demodulation. On the contrary, to improve resource utilization, two group headers that are far away from each other select overlapping resources as much as possible. Consequently, a group header obtains different resources through contention at different locations, and some resources are not suitable for group members.

Figures 5, 6:
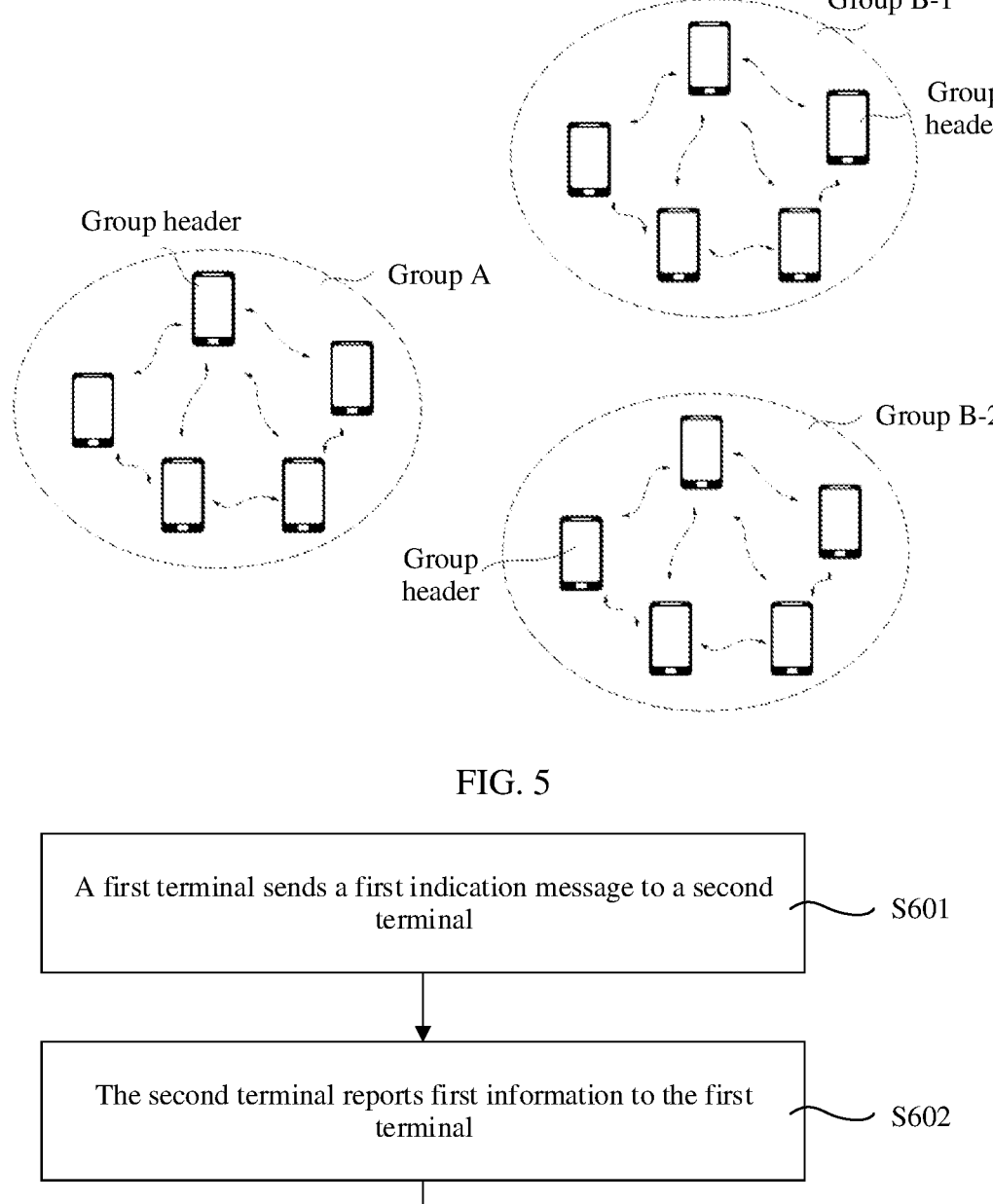
FIG. 5 is a schematic diagram of a resource selection difference influenced by positions of a plurality of groups.
FIG. 6 is a generalized flowchart of an information sending method according to an embodiment of this application.

As shown in FIG. 5, there are three groups: a Group A, a Group B-1, and a Group B-2. A group header in Group B-1 is far away from the Group A. Therefore, when contending for a resource, the group header in Group B-1 may determine that interference from the Group A to the Group B-1 is low, and therefore select a resource that overlaps or coincides with a resource for the Group A. However, a bottom-left group member of the Group B-1 is close to the Group A. Selecting a resource that coincides with the resource for the Group A results in high interference. Consequently, performance of these user equipments is poor. A group header in Group B-2 is close to the Group A. Therefore, when contending for a resource, the group header in Group B-2 may determine that interference from the Group A to the Group B-2 is high, and therefore select a resource completely different from the resource for the Group A. A bottom-right group member of Group B-2 is far away from the Group A. Therefore, the group member can use a resource overlapping with the resource for the Group A. As a result, resource utilization is low.

To resolve the foregoing problem, an embodiment of this application provides an information sending method to assist a group header in resource selection. Resources are selected for communication between group members. Therefore, obtaining feedback from group members is an important means to ensure resource selection performance. Specifically, a group member terminal device measures resource occupation on a channel, and reports a measurement result to a group header. Based on a measurement result of the group header and the result reported by the group member, the group header determines a final resource for sidelink communication, and sends the resource for sidelink communication to all group members, thereby ensuring group communication performance.

FIG. 6 shows a generalized procedure of an information sending method according to an embodiment of this application. The method is applied to a wireless communication system that includes a first terminal and a second terminal, where the first terminal is a group header, the second terminal is a group member, and there is one or more second terminals. The method mainly includes the following steps.

S601. The first terminal sends a first indication message to the second terminal, where the first indication message indicates the second terminal to report first information. Specifically, the first indication message includes an indication of a first information report occasion, an indication of a to-be-measured resource set, an indication of a type of reported content, an indication of a measurement threshold, an indication of a sending mechanism for the first information, and the like.

S602. The second terminal reports the first information to the first terminal. The first information indicates channel state information of a channel resource, where the channel resource is a resource that the first terminal indicates the second terminal to measure. Specifically, the second terminal measures the resource according to the first indication message sent by the first terminal, and periodically or aperiodically reports the first information to the first terminal after the measurement is completed. The first information includes interference information that is of a corresponding to-be-measured resource and that is collected by the second terminal. The interference information includes, for example, information about interference from an adjacent terminal to the to-be-measured resource, where the adjacent terminal may include a terminal in a group to which the second terminal belongs or a terminal in an adjacent group. When the second terminal collects information about interference from the terminal in the adjacent group to the corresponding to-be-measured resource, and reports the information to the first terminal, the first terminal selects a resource based on the interference information, to avoid interference from the adjacent group to transmission on resources in the group. This improves transmission efficiency. Certainly, the interference information also includes information about interference from a non-adjacent terminal to the to-be-measured resource. In an optional implementation, when measuring the to-be-measured resource, the second terminal measures only interference from a terminal device that is in another group to the to-be-measured resource. In other words, the first information includes only interference from a terminal device in another group to the to-be-measured resource. Optionally, the second terminal completes resource measurement before receiving the first indication message from the first terminal, and directly reports the first information according to the indication when receiving the first indication message sent by the first terminal.

S603. The first terminal sends a second indication message to the second terminal, where the second indication message indicates information about a first resource set, the first resource set is determined by the first terminal based on the received first information, and a resource in the first resource set is a resource for sidelink communication. Specifically, the first terminal determines the first resource set based on second information and the first information that is reported by the second terminal, where the second information is a set obtained through measurement performed by the first terminal. Then the first terminal sends the first resource set to the second terminal in the group by sending the second indication message.

Figures 7A, 7B:
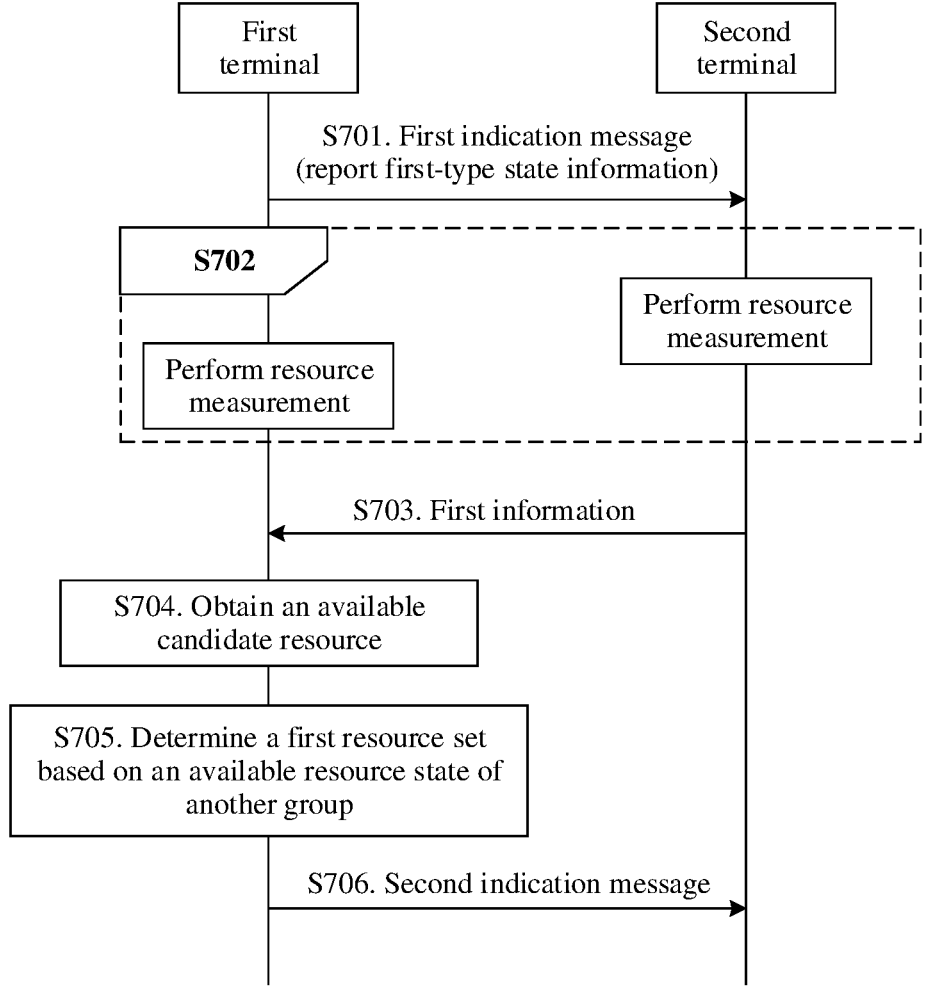

With reference to FIG. 4A, FIG. 7A shows an information sending method according to an embodiment of this application. The method is applied to a wireless communication system that includes a first terminal and a second terminal, where the first terminal is a group header, the second terminal is a group member, and there is one or more second terminals. The method is about reporting first-type state information, and mainly includes the following steps.

S701. The first terminal sends a first indication message to the second terminal, where the first indication message indicates the second terminal to report first information. The first information indicates channel state information of a channel resource, where the channel resource is a resource that the first terminal indicates the second terminal to measure.

In an optional implementation, after the first terminal is selected as the group header, the first terminal sends the first indication message to the second terminal, to indicate the second terminal to report the first information.

In an optional implementation, after the first terminal detects a newly added second terminal, in other words, detects a newly added group member device, the first terminal sends the first indication message to the newly added second terminal or all second terminals, to indicate the newly added second terminal or all the second terminals to report first information.

Specifically, the first indication message includes the following types of indication information.

1. Indication of a type of a report occasion. When sending the first indication message to the second terminal, the first terminal needs to configure a corresponding report occasion. Report occasion configuration may include two types: periodic report configuration and aperiodic report configuration.

Periodic report configuration means that once receiving the configuration, the second terminal performs corresponding measurement and reports the first information to the first terminal on a fixed cycle. The cycle may be 1 ms, 2 ms, 5 ms, 10 ms, 20 ms, 40 ms, 80 ms, 160 ms, or 320 ms.

In an optional implementation, the first terminal may separately configure a measurement cycle and a report cycle for the second terminal. A specific measurement cycle and report cycle may be the same or different.

In an optional implementation, the first terminal measures a moving speed of the second terminal, or the second terminal reports the moving speed to the first terminal. The first terminal configures different cycles based on moving speeds of the second terminal.

The aperiodic report configuration means that the first terminal indicates, based on a requirement, the second terminal to report the first information, and the second terminal reports the first information at a specific moment after receiving the indication.

In an optional implementation, the first terminal dynamically indicates, in the indication information, the second terminal to report the first information at a specific moment.

In an optional implementation, when receiving the indication information sent by the first terminal, the second terminal reports the first information after default duration.

In an optional implementation, the first terminal measures a distance between the first terminal and the second terminal. When the distance changes and reaches a first distance threshold, the first terminal sends, to the second terminal, an indication for reporting the first information, to trigger the second terminal to aperiodically report the first information.

2. Indication of a to-be-measured resource set. The first terminal configures a to-be-measured resource set for the second terminal. After receiving the indication of a to-be-measured resource set, the second terminal measures and reports to-be-measured resources in the to-be-measured resource set. The to-be-measured resource set indicates a position of a channel resource measured by the second terminal. Specifically, the to-be-measured resource set is a universal set or a subset of a resource pool of the first terminal. There are two resource pool configuration scenarios. In one scenario, the first terminal is in a network coverage area of a base station, and the resource pool configuration is obtained from a system message of the base station. In another scenario, if the first terminal is not in a network coverage area of a base station, the resource pool configuration is preconfigured.

In an optional implementation, the first terminal indicates the universal set or the subset of the resource pool as the to-be-measured resource set for the second terminal based on historical resource usage. For example, according to statistics, if bit error rates of some resources in the resource pool are high, these resources are not included the to-be-measured resource set.

In an optional implementation, second terminals report terminal capabilities to the first terminal in advance, and the first terminal configures different to-be-measured resource sets based on performance differences of the second terminals. For example, a to-be-measured resource set configured for a low-performance second terminal includes less resources, and a to-be-measured resource set configured for a high-performance second terminal includes more resources.

3. Indication of a type of reported content. In this embodiment, the type of reported content is first-type state information, where the first-type state information indicates whether channel quality of a channel resource reaches a first threshold. Specifically, the channel quality includes RSRP (Reference Signal Received Power, reference signal received power), an SINR (Signal to Interference plus Noise Ratio, signal to interference plus noise ratio), RSRQ (Reference Signal Received Quality, reference signal received quality), or the like.

In an optional implementation, the second terminal may set 1 for a resource whose measurement value reaches the measurement threshold, and set 0 for a resource whose measurement value does not reach the measurement threshold. As shown in FIG. 7B, it is assumed that a to-be-measured resource set configured by the first terminal is S and includes five to-be-measured resources. Measurement values of a resource 1 and a resource 5 are below the measurement threshold. In this case, the second terminal sets 1 for the corresponding resources. Measurement values of other resources are not below the measurement threshold, and then the second terminal sets 0 for the corresponding resources.

4. Indication of a measurement threshold, that is, an indication of a first threshold. In this embodiment, for the type of reported content, the first terminal may indicate a measurement threshold in the type of reported content for group member devices. Alternatively, the threshold may be a default value, and the second terminal uses the default value. In this embodiment, when interference in the indication of a type of reported content is RSRP, the measurement threshold may be −60 dBm, −65 dBm, −70 dBm, −75 dBm, −80 dBm, −85 dBm, and the like.

5. Indication of a sending mechanism for first information. In an optional implementation, a report indication of the first information is configured by the first terminal, and the report is performed on a reserved resource. After receiving the indication, the second terminal reports the first information on the reserved resource. In this way, it can be ensured that the first terminal receives, in an estimated period, first information reported by all the second terminals.

In an optional implementation, a report indication of the first information is configured by the first terminal, and the report is performed on an autonomously selected resource. After receiving the indication, the second terminal needs to sense a resource, and reports the first information to the first terminal when sensing an appropriate resource. For this reporting manner, because a resource conflict may occur when the appropriate resource is obtained through sensing, the first terminal needs to start a timer to determine whether the first information reported by the second terminal is received in time.

The first terminal may pack the foregoing several types of indication information into one message and send the message to the second terminal, or may send the information to the second terminal by using several messages. This is not limited in this embodiment of this application. The first terminal may send the first indication message to the second terminal by sending a message such as an RRC (Radio Resource Control, radio resource control) message, an MCE (MAC Control Element, MAC control element) message, or an SCI (Sidelink Control Indicator, sidelink control indicator) message. A type of the bearer message is not limited in this embodiment of this application. After obtaining an appropriate resource through sensing, the first terminal sends the first indication message to the second terminal. Because a resource conflict may occur when the appropriate resource is obtained through sensing, the first terminal may increase a probability of successfully sending the first indication message by sending the message for a plurality of times.

S702. The first terminal and the second terminal perform resource measurement. Specifically, the second terminal measures the to-be-measured resources in the to-be-measured resource set indicated by the first terminal. The first terminal may measure all resources in the resource pool, or perform measurement based on a union of to-be-measured resource sets configured for all second terminals. In this embodiment, when interference in the indication of a type of reported content is RSRP, the second terminal and the first terminal perform RSRP measurement on each resource. If the second terminal is a terminal device that cannot perform sensing or a terminal device that can perform sensing only at a specific level, the second terminal may obtain a measurement result by receiving measurement information shared by an ambient second terminal. The terminal device that cannot perform sensing is usually a terminal device having a high requirement for power consumption, for example, a mobile phone or an Internet of Things mobile device. The terminal device that can perform sensing only at a specific level is usually a terminal device with low performance, for example, a terminal device of a roadside unit, and cannot achieve full resource sensing.

In an optional implementation, during measurement of a to-be-measured resource, the first terminal and the second terminal do not determine whether interference to the to-be-measured resource comes from a terminal device in the current group or a terminal device in another group. In other words, interference to the to-be-measured resource by all terminal devices is measured.

In an optional implementation, during measurement of the to-be-measured resource, the first terminal and the second terminal measures only interference from a terminal device in another group to the to-be-measured resource. Optionally, a zero power CSI (Channel State Information) reference signal mechanism may be used to obtain the interference from a terminal device in another group to the to-be-measured resource. Specifically, a time-frequency position of a zero power CSI reference signal is associated with a group. To be specific, time-frequency positions of zero power CSI reference signals used by terminal devices in a group are the same, and time-frequency positions of zero power CSI reference signals in different groups are different. Because a transmit power of a terminal device in the current group is zero on a time-frequency resource of a corresponding zero-power CSI reference signal, signal energy obtained by the terminal device in the current group through measurement on the time-frequency resource of the zero power CSI reference signal corresponding to the current group is interference from a terminal device in another group. Optionally, an SCI (Sidelink Control Indicator) mechanism multicast in the current group may be used to obtain the interference from a terminal device in another group to the to-be-measured resource. Specifically, for a to-be-measured resource on which data is being transmitted, a terminal device in a group may receive an SCI of the group, measure RSRP (Reference Signal Received Power) of a PSSCH DMRS (Demodulation Reference Signal) indicated in the SCI, perform linear averaging when there are a plurality of DMRS symbols, and normalize the RSRP obtained through measurement into RSRP on each RE (Resource Element). In addition, the terminal device in the group may measure the to-be-measured resource to obtain an RSSI (Received Signal Strength Indicator), and normalize the RSSI obtained through measurement into an RSSI (Received Signal Strength Indicator) on each RE. Finally, the RSRP on each RE is subtracted from the RSSI on each RE to obtain interference from a terminal device in another group to the to-be-measured resource. For a to-be-measured resource on which no data is being transmitted, a terminal device in a group directly measures the to-be-measured resource to obtain an RSSI, and normalizes the RSSI obtained through measurement into an RSSI on each RE. The RSSI on each RE is considered as interference from a terminal device in another group to the to-be-measured resource. An implementation of obtaining the interference to a to-be-measured resource by a terminal device in another group is not limited in this embodiment of this application.

In an optional implementation, step S702 is performed before S701. The second terminal completes measurement of all resources in the resource pool before receiving the first indication message sent by the first terminal. The resource pool may be obtained from the base station, or may be preconfigured. In this way, after receiving the first indication message, the second terminal may directly report the first information based on the indication information.

S703. The second terminal reports the first information to the first terminal. Specifically, when the type of the report occasion configured by the first terminal is periodic report, the second terminal reports the first information at fixed moments according to a cycle, as shown in FIG. 7C. A measurement cycle and a report cycle may be different. When the type of the report occasion configured by the first terminal is aperiodic report, the first terminal may dynamically indicate the second terminal to report the first information at a specific moment, or when receiving the indication message, the second terminal reports the first information at a moment after default duration (n duration), as shown in FIG. 7D. Optionally, the first terminal may selectively trigger some second terminals to aperiodically report the first information. For example, when the first terminal needs to obtain first information of a specific second terminal, the first terminal may indicate only the second terminal to aperiodically report the first information.

After confirming a report moment, the second terminal sends the first information to the first terminal according to a specific sending mechanism configured by the first terminal. When the sending mechanism configured by the first terminal is to report the first information on a reserved resource, the second terminal reports the first information on the reserved resource. When the sending mechanism configured by the first terminal is to report the first information on an autonomously selected resource, the second terminal first senses the resource, and then reports the first information.

With reference to any one of the foregoing implementations, in an optional implementation, the first information reported by the second terminal includes M bits, where M is a quantity of to-be-measured resources in the to-be-measured resource set indicated by the first terminal, and each bit represents whether a measurement result of one resource reaches a measurement threshold. When a measurement result of a resource is below the measurement threshold, a corresponding bit is set to 1. When the measurement result of the resource is not below the measurement threshold, the corresponding bit is set to 0. In this way, after the first terminal receives the first information sent by the second terminal, based on the indication that is of the to-be-measured resource set and that is sent to the second terminal, the first terminal may obtain a measurement result of each resource due to a one-to-one correspondence.

With reference to any one of the foregoing implementations, in an optional implementation, the first information reported by the second terminal includes M bytes, where M is a quantity of resources indicated by the first terminal, and each byte represents whether a measurement result of a resource reaches a measurement threshold. When a measurement result of a resource is below the measurement threshold, a corresponding byte is set to a value other than 0. When the measurement result of the resource is not below the measurement threshold, the corresponding byte is set to 0. In this way, after the first terminal receives the first information sent by the second terminal, based on the indication that is of the to-be-measured resource set and that is sent to the second terminal, the first terminal may obtain a measurement result of each resource block due to a one-to-one correspondence.

With reference to any one of the foregoing implementations, in an optional implementation, the first information reported by the second terminal includes time-frequency positions and measurement results of resources in a group. In this way, after the first terminal receives the first information reported by the second terminal, the first terminal may directly obtain a measurement result of a resource at a specific time-frequency position.

After receiving the first information reported by the second terminal, the first terminal stores the first information. FIG. 7E shows an example of storing first information of a second terminal in a table. A blank position in the table indicates that the first terminal does not indicate the second terminal to measure a resource block at the position. For example, the first terminal does not indicate a second terminal 2 to measure a resource 1. Alternatively, the first terminal may store the first information reported by the second terminal in another manner. This is not limited in this embodiment of this application.

With reference to any one of the foregoing implementations, in an optional implementation, the second terminal use a message to carry the first information, such as an RRC (Radio Resource Control, radio resource control) message, an MCE (MAC Control Element, MAC control element) message, and an SCI (Sidelink Control Indicator, sidelink control indicator) message. The SCI message is carried by using a control channel (Physical Sidelink Control Channel, physical sidelink control channel). Therefore, a user identifier of the second terminal implementing report needs to be included in the first information, so that the first terminal can identify the second terminal that reports the first information. The RRC message and the MCE message are carried by using a data channel (Physical Sidelink Shared Channel, physical sidelink shared channel). Therefore, when receiving the first information, the first terminal may identify, based on scrambling information, the second terminal implementing report.

With reference to any one of the foregoing implementations, in an optional implementation, after the second terminal reports the first information to the first terminal, the second terminal measures a distance between the second terminal and the first terminal. When the distance changes and reaches a second distance threshold, the second terminal actively reports the first information to the first terminal. In this way, untimely report of the first information caused by a great change in a position of the second terminal can be prevented.

It should be noted that a measurement value obtained by the second terminal through measurement may be directly compared with the measurement threshold to generate the first information for report, or filtering is performed on the measurement value obtained by the second terminal through measurement, and then the measurement value is compared with the measurement threshold to generate the first information for report. This is not limited in this embodiment of this application. In addition, the wireless communication system further includes a third terminal. The third terminal belongs to another group. The first information includes information about interference from the third terminal to the to-be-measured resources in the to-be-measured resource set.

S704. The first terminal obtains available candidate resources. Specifically, the first terminal performs decision-making, based on the first information reported by the second terminal and second information, to obtain the available candidate resource, where the first information is a resource set obtained through measurement performed by the second terminal, and the second information is a resource set obtained through measurement performed by the first terminal.

In an optional implementation, the first information includes a first measurement result obtained through measurement performed by the second terminal on the to-be-measured resources in the to-be-measured resource set, and the first terminal measures the to-be-measured resources in the to-be-measured resource set to obtain a second measurement result. The first terminal uses a resource in an intersection of the first measurement result and the second measurement result as an available candidate resource.

In an optional implementation, resource sets obtained through measurement performed by the second terminals are respectively $S_1$, $S_2$, . . . , and $S_N$, where N is a quantity of group members. A resource set obtained through measurement performed by the first terminal is $S_0$, and a quantity of elements in the resource set $S_0$ is $|S_0|$. A quantity of available candidate resources determined by the first terminal is K, and the available candidate resources include a second resource set and a third resource set.

First, to ensure sufficient available resources for the first terminal, the first terminal determines the second resource set based on the first information and the second information. Specifically, the first terminal selects K1 resources from a fourth resource set S', and a set including the selected K1 resources is $S_0^{K1}$, that is, the second resource set. A percentage of resources in the fourth resource set S' that are measured by the second terminal and whose measurement results reach a measurement threshold is greater than or equal to a first percentage. The first percentage may be 60%, 80%, or the like. If the first percentage is 100%, it indicates that an intersection is needed. If the first percentage is 1/N, it indicates that a union is needed. Alternatively, a percentage of resources in the fourth resource set S' that are measured by the first terminal and the second terminal and whose measurement results meet a measurement threshold is greater than or equal to a first percentage. The first percentage may be 60%, 80%, or the like. If the first percentage is 100%, it indicates that an intersection is needed. If the first percentage is 1/(1+N), it means to a union is needed. An intersection of S' and $S_0$ is $S' \cap S_0$, and a quantity of elements in $S' \cap S_0$ is $|S' \cap S_0|$. When $|S' \cap S_0|$ is greater than or equal to K1, the group header selects the K1 resources from $S' \cap S_0$ as available candidate resources, where the K1 resources are K1 resources with the minimum interference in the resource set $S_0$ obtained through measurement performed by the first terminal; or the K1 resources are K1 resources randomly selected from $S' \cap S_0$. When $|S' \cap S_0|$ is less than K1, the first terminal selects all resources in $S' \cap S_0$ as available candidate resources, and selects $K1 - |S' \cap S_0|$ resources from $S_0$ as available candidate resources, where the $K1 - |S' \cap S_0|$ resources are $K1 - |S' \cap S_0|$ resources with the minimum interference in $S_0$; or the $K1 - |S' \cap S_0|$ resources are $K1 - |S' \cap S_0|$ resources randomly selected from $S_0$.

Then the first terminal determines the third resource set based on the first information and the second information. Specifically, the first terminal selects K−K1 resources from unselected resources as available candidate resources, where a set including the K−K1 resources is the third resource set. Specifically, S" is a relative complement of $S_0^{K1}$ in S', that is, an element in S" belongs to S' but does not belong to $S_0^{K1}$, and a quantity of elements in the relative complement S" is $|S"|$. When K−K1 is less than or equal to $|S"|$, K−K1 resources are randomly selected from S" as available candidate resources. When K−K1 is greater than $|S"|$, the first terminal selects all resources in S" as available candidate resources, and then randomly selects $K−K1−|S"|$ resources from unselected resources in $S_1$, $S_2$, . . . , and $S_N$ as available candidate resources. Alternatively, $K−K1−|S"|$ resources are preferentially selected from a resource set obtained through measurement performed by the second terminal with a large traffic volume as available candidate resources. If resources are insufficient, resources with the minimum interference are constantly selected from $S_0$ as available candidate resources until a resource requirement of the first terminal is met. During resource selection, a selected resource is not selected again.

It should be noted that a value of K1 may be equal to that of K. In other words, the requirement for available candidate resources can be met after the first terminal directly selects K1 resources from the fourth resource set.

S705. The first terminal determines the first resource set based on available candidate resources in the current group and an available resource state sent by a fourth terminal, where a resource in the first resource set is a resource for sidelink communication, and the fourth terminal is a group header of another group. Specifically, after determining an available resource, the fourth terminal sends an available resource state to the first terminal, and the first terminal finally determines the first resource set based on the available candidate resources determined in step S704 and the available resource state of the another group. For example, the available candidate resources obtained in step S704 are a resource 1, a resource 2, a resource 3, a resource 4, and a resource 5, and received available resources sent by the fourth terminal are the resource 3 and the resource 4. In this case, the first terminal decides that the first resource set includes the resource 1, the resource 2, and the resource 5. When the first resource set is decided, the first terminal notifies the fourth terminal of the first resource set.

With reference to any one of the foregoing implementations, in an optional implementation, if the first terminal is in the network coverage area of the base station, the first terminal may report the available candidate resources to the base station. The base station performs decision-making to obtain the available resources for the group to which the first terminal belongs, and then configures the available resources to the first terminal.

In an optional implementation, step S705 is not performed. To be specific, the available candidate resources obtained in step S704 are directly used as the first resource set. In other words, the first terminal directly determines the first resource set based on the received first information, and does not need to notify a group header in another group of the first resource set. The first terminal directly performs step S706.

S706. The first terminal sends a second indication message to the second terminal, where the second indication message indicates information of the first resource set. When step S705 exists in this embodiment, the first terminal sends the first resource set determined in step S705 to the second terminal. When step S705 does not exist in this embodiment, the first terminal uses the available candidate resources obtained in S704 as the first resource set, and sends the first resource set to the second terminal.

In an optional implementation, after obtaining an appropriate resource through sensing, the first terminal sends the second indication message to the second terminal. Because a resource conflict may occur when the appropriate resource is obtained through sensing, the first terminal may increase a probability of successfully sending a message by sending the message for a plurality of times. Specifically, the first terminal may send the second indication message to the second terminal by sending a message such as an RRC (Radio Resource Control, radio resource control) message, an MCE (MAC Control Element, MAC control element) message, or an SCI (Sidelink Control Indicator, sidelink control indicator) message. When information in the second indication message is of a small size, the SCI message is suitable for carrying the second indication message, so that resource overheads can be reduced. When the information in the second indication message is of a large size, the RRC message or the MCE message is suitable for carrying the second indication message, which helps extension of a size of the second indication message.

S707. At least one of the first terminal and the second terminal performs sidelink communication on a resource in the first resource set. This step is not shown in FIG. 7A. Specifically, when the terminal device, including the first terminal and the second terminal, in the group needs to send data to another device in the group, the terminal device senses resources in the first resource set to obtain an appropriate sidelink resource, and then sends the data on the sidelink resource.

Figures 8A, 8B:
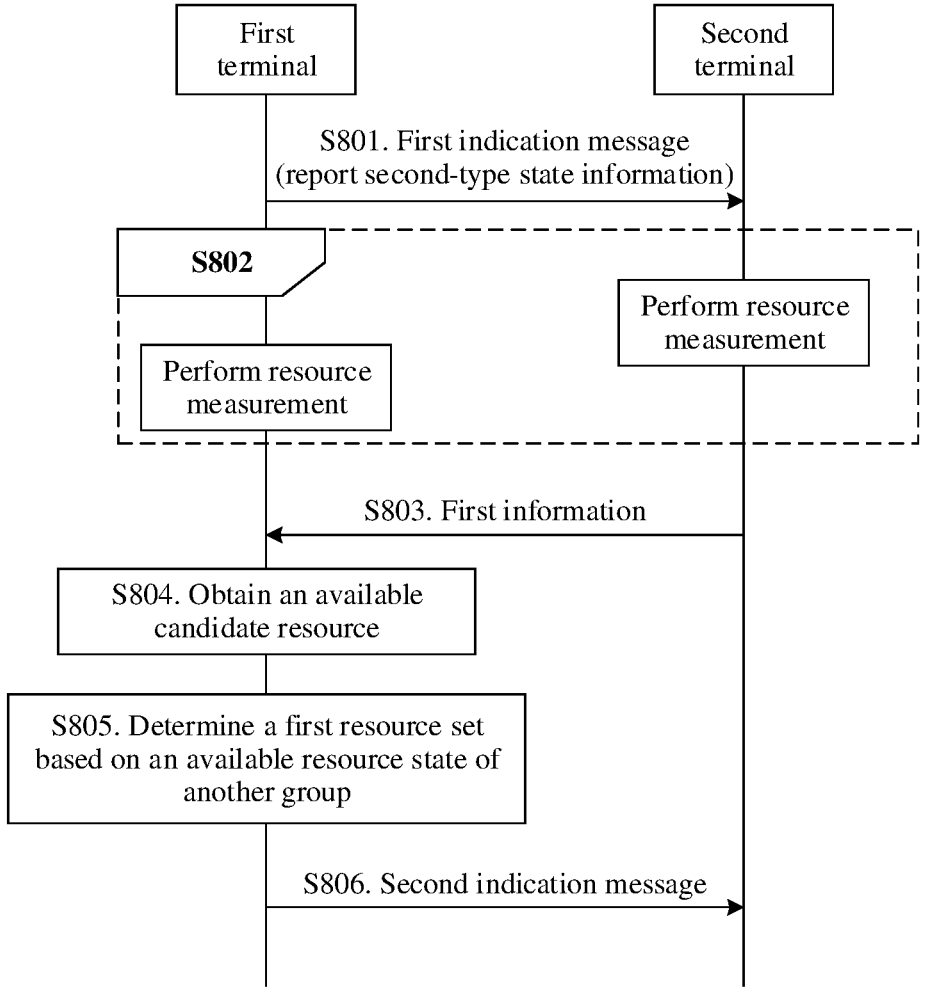
FIG. 8A and FIG. 8B are a flowchart and schematic diagram of an information sending method for reporting a second-type state information according to an embodiment of this application.

With reference to FIG. 4A, FIG. 8A shows an information report method according to an embodiment of this application. The method is applied to a wireless communication system that includes a first terminal and a second terminal, where the first terminal is a group header, the second terminal is a group member, and there is one or more second terminals. The method is about reporting second-type state information, and mainly includes the following steps.

S801. The first terminal sends a first indication message to the second terminal, where the first indication message indicates the second terminal to report first information. Specifically, the indication information in the first indication message is the same as that described in step S701 in FIG. 7A except an indication of a type of reported content and an indication of a measurement threshold. Details are not described herein again.

In this embodiment, a type of reported content is second-type state information, and the second-type state information is channel quality of a channel resource. Specifically, the channel quality includes RSRP (Reference Signal Receiving Power, reference signal receiving power), an SINR (Signal to Interference plus Noise Ratio, signal to interference plus noise ratio), RSRQ (Reference Signal Receiving Quality, reference signal receiving quality), or the like. As shown in FIG. 8B, it is assumed that a to-be-measured resource set configured by the first terminal for the second terminal is S, including five to-be-measured resources. When an interference measurement indication is an RSRP value, interference values that are of the five resources and that are obtained through measurement performed by the second terminal are respectively −80 dBm, −85 dBm, −75 dBm, −70 dBm, and −80 dBm.

In this embodiment, because the second terminal directly reports the interference measurement values, the first terminal does not need to send the measurement threshold indication to the second terminal.

S802. The first terminal and the second terminal perform resource measurement. A specific measurement manner is the same as that described in step S702, and details are not described herein again.

Similar to the step S702 in FIG. 7A, in an optional implementation, step S802 is performed before S801. The second terminal completes measurement of all resources in the resource pool before receiving the first indication message sent by the first terminal. The resource pool may be obtained from a base station, or may be preconfigured. In this way, after receiving the first indication message, the second terminal directly reports the first information based on the indication information.

S803. The second terminal reports the first information to the first terminal. Specifically, except reported content, content in the first information is the same as that in step S703 in FIG. 7A. Details are not described herein again. In this embodiment, the second terminal reports a specific interference value to the first terminal after measuring a specified resource.

In an optional implementation, the second terminal measures a specified resource to obtain an interference value without performing any processing, and directly reports the specific interference value to the first terminal.

In an optional implementation, the second terminal measures a specified resource to obtain an interference value and performs processing such as filtering and smoothing, and reports a measurement result obtained through processing to the first terminal.

S804. The first terminal obtains available candidate resources. Specifically, the first terminal performs decision-making, based on the first information reported by the second terminal and second information, to obtain available candidate resources, where the first information is an interference set obtained through measurement performed by the second terminal, and the second information is an interference set obtained through measurement performed by the first terminal.

Interference sets obtained through measurement performed by second terminals are $S_1$, $S_2$, . . . , and $S_N$, where N is a quantity of group members, and an interference set obtained through measurement performed by the first terminal is $S_0$. K available candidate resources are determined by the first terminal. The available candidate resources include a second resource set and a third resource set.

First, to ensure sufficient available resources for the first terminal, the first terminal determines the second resource set based on the second information. The second information is a resource set obtained through measurement performed by the first terminal, that is, $S_0$. The second resource set is determined by the first terminal from a fourth resource set, where the fourth resource set is the resource set $S_0$ obtained through measurement performed by the first terminal in this embodiment. Specifically, the first terminal selects K1 resources with the least interference from $S_0$ as available candidate resources, where K1 is less than or equal to K. Then the first terminal determines the third resource set based on the first information and the second information. Specifically, the first terminal selects K−K1 resources as available candidate resources from resources that have not been selected. A set including the K−K1 resources is the third resource set, and the quantity K−K1 of resources in the third resource set is a third quantity.

In an optional implementation, the first terminal arranges, in descending order based on traffic volumes of second terminals, interference sets obtained through measurement performed by the second terminals. When arranged in descending order, the interference sets obtained through measurement performed by the second terminals are $S'_1$, $S'_2$, . . . , and $S'_N$, where $S'_1$ is an interference set obtained through measurement performed by a second terminal with the largest traffic volume, and $S'_N$ is an interference set obtained through measurement performed by a second terminal with the smallest traffic volume. The first terminal keeps selecting resources with the minimum interference from the interference sets arranged in descending order as available candidate resources, until K−K1 available candidate resources are selected. During resource selection, a selected resource is not selected again.

In another optional implementation, the first terminal calculates average interference of each resource. When the interference value obtained through measurement is an RSRP value, a formula for calculating the average interference is $1/N\Sigma_{n=l}^{N}rsrp_n^m$, where a value of l may be 0 or 1, $rsrp_0{}^m$ represents an interference value obtained through measurement performed by the first terminal on the $m^{th}$ resource, $rsrp_n{}^m$ ($n=1, \ldots, N$) represents an interference value obtained through measurement performed by the $n^{th}$ second terminal on the $m^{th}$ resource, and a unit is milliwatt (mW). The first terminal selects K–K1 resources with the minimum average interference as available candidate resources. A selected resource is not selected again during resource selection.

In another optional implementation, the first terminal converts the interference value of each resource into spectral efficiency. When the interference value obtained through measurement is an RSRP value, a specific conversion formula is $E_{n,m}=\ln(1+rsrp_0/rsrp_n{}^m)$, where $E_{n,m}$ represents spectral efficiency of the $n^{th}$ second terminal on the $m^{th}$ resource, $rsrp_0$ is a fixed value (for example, –80 dBm), and $rsrp_n{}^m$ represents an interference value obtained through measurement performed by the $n^{th}$ second terminal on the $m^{th}$ resource. Then a transmission period of each resource is calculated based on the traffic volume of the second terminal. A specific calculation formula is $\Sigma_{n=0}^{N}G_n/E_{n,m}$, where $G_n$ is a traffic volume of the $n^{th}$ second terminal. The first terminal selects K–K1 resources with the minimum transmission periods as available candidate resources. A selected resource is not selected again during resource selection.

It should be noted that a value of K1 may be equal to that of K. In other words, the requirement for available candidate resources can be met after the first terminal directly selects K1 resources from the fourth resource set.

Because the first information reported by the second terminal in this embodiment is a specific resource interference value, in an optional implementation, the first terminal may set different measurement thresholds based on terminal capabilities reported by the second terminals. For example, for a terminal that does not have a high requirement on a latency and a throughput, the first terminal may set a high measurement threshold, and for a terminal having a high requirement on the latency and the throughput, the first terminal may set a low measurement threshold. In this way, available candidate resources obtained by different second terminals are different.

S805. The first terminal determines a first resource set based on the available candidate resources in the group to which the first terminal belongs and an available resource state sent by a group header in another group, where a resource in the first resource set is a resource for sidelink communication. This step is the same as step S705 in FIG. 7A. Details are not described herein again.

It should be noted that, if the available candidate resources obtained by different second terminals in step S804 are different, different first resource sets are determined by the first terminal for different second terminals based on an available resource state sent by a group header of another group. After the first terminal obtains the first resource set for each second terminal, the first terminal notifies the group header in the another group of an intersection of the first resource sets for all the second terminals.

S806. The first terminal sends a second indication message to the second terminal, where the second indication message indicates information of the first resource set. This step is the same as step S706 in FIG. 7A. Details are not described herein again.

It should be noted that when first resource sets obtained through decision-making for different second terminals are different, first resource sets sent by the first terminal to different second terminals are also different.

S807. At least one of the first terminal and the second terminal performs sidelink communication on a resource in the first resource set. This step is not shown in FIG. 8A. This step is the same as step S707 in FIG. 7A. Details are not described herein again.

Figures 9A, 9B:
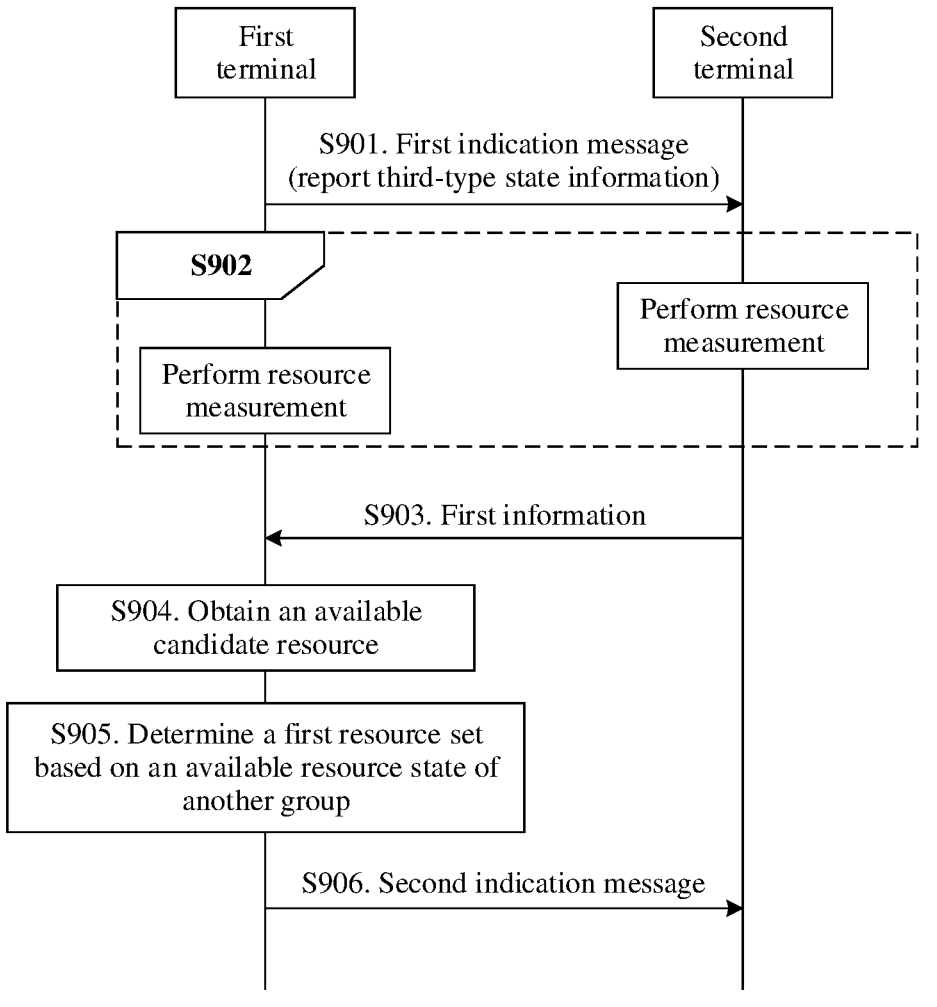
FIG. 9A and FIG. 9B are a flowchart and schematic diagram of an information sending method for reporting a third-type state information that reports a resource set according to an embodiment of this application.

With reference to FIG. 4A, FIG. 9A shows an information sending method according to an embodiment of this application. The method is applied to a wireless communication system that includes a first terminal and a second terminal, where the first terminal is a group header, the second terminal is a group member, and there is one or more second terminals. The method is about reporting third-type state information, and mainly includes the following steps.

S901. The first terminal sends a first indication message to the second terminal, where the first indication message indicates the first terminal to report first information. Specifically, indication information in the first indication message is the same as the information described in step S701 in FIG. 7A except an indication of a type of reported content and an indication of a measurement threshold. Details are not described herein again.

In this embodiment, the type of reported content is third-type state information, and the third-type state information indicates whether a bit error rate of a channel resource reaches a second threshold. Specifically, the second terminal collects a bit error rate of data transmission on a measured resource indicated by the first terminal. A measurement threshold configured by the first terminal, that is, a second threshold, may be 1%, 5%, 10%, or the like. In an optional implementation, the second terminal may use a default measurement threshold, for example, 5%, and does not need to obtain the measurement threshold from the first terminal.

S902. The first terminal and the second terminal perform resource measurement. Because measurement of a bit error rate of a resource requires service data transmission on the resource, the bit error rate can be obtained only after data transmission is performed for a period of time.

In an optional implementation, the type of reported content in this embodiment may be indicated by the first terminal after other types of reported content are used for operation for a period of time, to obtain better performance.

In an optional implementation, the first terminal sends the indication of a type of reported content in this embodiment to the second terminal at an initial stage, and the second terminal reports the first information to the first terminal after data transmission is performed for a period of time.

Similar to step S702 in FIG. 7A, in an optional implementation, step S902 is performed before S901. The second terminal performs data transmission for a period of time and obtains a bit error rate of a used resource before receiving the first indication message sent by the first terminal. In this way, after receiving the first indication message, the second terminal directly reports the first information based on the indication information.

S903. The second terminal reports the first information to the first terminal. Specifically, except reported content, content in the information is the same as that in step S703 in FIG. 7A. Details are not described herein again. In this embodiment, the second terminal reports a measurement result of a specific resource to the first terminal. As shown in FIG. 9B, it is assumed that a measurement resource set configured by the first terminal is S, including five measured resources. Bit error rates of a resource 2 and a resource 3 are below a bit error rate threshold. In this case, 1 is set for the corresponding resources. If bit error rates of remaining resources are not below the bit error rate threshold, 0 is set on the corresponding resources.

S904. The first terminal obtains available candidate resources. Specifically, the first terminal performs decision-making, based on the first information reported by the second terminal and the measurement information obtained by the first terminal, to obtain the available candidate resources. This step is the same as step S704 in FIG. 7A. Details are not described herein again.

S905. The first terminal determines a first resource set based on available candidate resources in a group to which the first terminal belongs and an available resource state sent by a group header in another group, where a resource in the first resource set is a resource for sidelink communication. This step is the same as step S705 in FIG. 7A. Details are not described herein again.

S906. The first terminal sends a second indication message to the second terminal, where the second indication message indicates information of the first resource set. This step is the same as step S706 in FIG. 7A. Details are not described herein again.

S907. At least one of the first terminal and the second terminal performs sidelink communication on the resource in the first resource set. This step is not shown in FIG. 9A. This step is the same as step S707 in FIG. 7A. Details are not described herein again.

It can be learned from the foregoing embodiments of this application that, according to the sidelink technology applying the group-based mechanism, after obtaining information such as interference of the entire group, a group header can perform unified management to provide reliable information input. This can resolve problems of strong interference on an edge terminal device and low resource utilization in the group, and improve system communication performance. It can be learned from the foregoing embodiments that the information report methods provided in the three embodiments have respective advantages. In the method for reporting the first-type state information in FIG. 7, the first information reported by the group member device is simple. In this way, fewer resources are occupied when the group member device reports the first information. In the method for reporting the second-type state information in FIG. 8, the group member device reports a specific measurement value of a resource. In this way, the group header can perform differentiated processing on different group member devices based on specific measurement values. In the method for reporting the third-type state information in FIG. 9, the group header may determine a resource for sidelink communication based on a bit error state in actual data transmission.

According to the foregoing descriptions, the group header may change content in the first indication message for different scenarios. For example, the group header first uses the method for reporting the first-type state information. After running for a period of time, the group header may use the method for reporting the third-type state information. In this way, the group header may obtain a bit error state of a resource, and obtain a resource for sidelink communication based on the bit error state. Consequently, a resource for sidelink communication obtained through decision-making is accurate. In addition, when a bit error rate reaches a threshold, an indication for reporting first information is switched to the method for reporting the second-type state information. As a result, a measurement result reported by a group member device can be accurate, and differentiated processing can be performed on group member devices. Therefore, the system efficiency of the entire group is improved.

Figure 10:
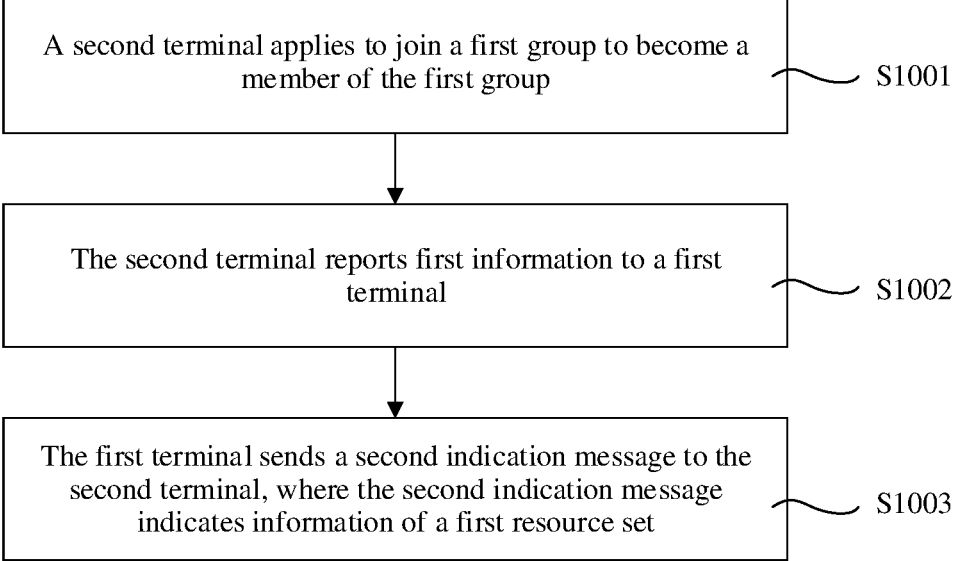
FIG. 10 is a schematic flowchart of an information report method according to an embodiment of this application.

The following shows an information report method according to an embodiment of this application. The method is applied to a wireless communication system that includes a first terminal and a second terminal, where the first terminal is a group header in a first group. As shown in FIG. 10, the method includes the following steps.

S1001. The second terminal sends a group joining application to the first terminal, and in response to a received application approval message sent by the group header, joins a first group to become a member of the first group. Specifically, when the second terminal detects that the first group is around, the second terminal may receive a first operation, that is, user selection, and join the first group as shown in FIG. 4B and FIG. 4C. Alternatively, the second terminal can autonomously choose to join the first group. For example, the second terminal chooses to join a group whose group header is closest to the second terminal.

S1002. The second terminal reports first information to the first terminal, where the first information is information for assisting the first terminal in selecting a first resource set, and a resource in the first resource set is a resource for sidelink communication.

In an optional implementation, after the second terminal joins the first group and becomes the member of the first group, the second terminal reports the first information to the first terminal, where the reported first information is of a default type.

In an optional implementation, after detecting a new first-group member, the first terminal sends a first indication message to the first-group member, and the first-group member reports the first information to the first terminal according to the first indication message. Details about the first indication message are the same as those described in step S701 in FIG. 7. The details are not described herein again.

S1003. The second terminal receives a second indication message sent by the first terminal, where the second indication message is information indicating the first resource set. Details about determining and sending the first resource set are the same as those described in steps S704 to S706 in FIG. 7. The details are not described herein again.

In an optional implementation, by default, all terminals support report of first information of a specific type. For example, by default, all the terminals support report of first-type state information. After joining a group and becoming a group member device, a terminal autonomously reports the first information to a group header on a default cycle or based on a change of distance between the terminal and the group header. To be specific, the group member device does not need to wait for a first indication message sent by the group header, to report the first information to the group header.

Figure 11:
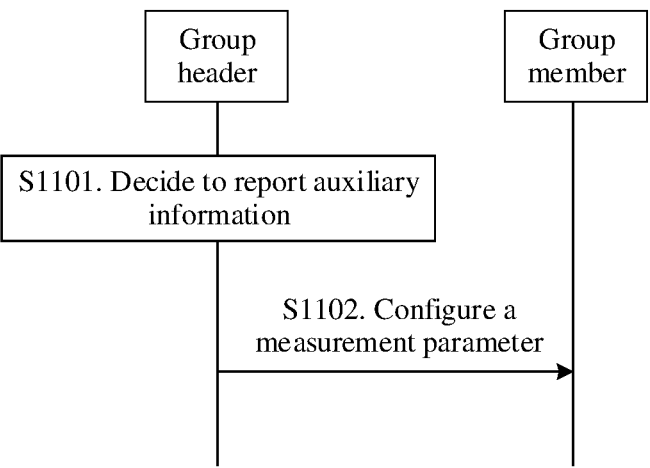
FIG. 11 is a schematic flowchart of a method for triggering, by a group header, a group member to report first information according to an embodiment of this application.

Refer to FIG. 11. FIG. 11 shows a method for triggering, by a group header, a group member to report first information according to an embodiment of this application. The method includes the following steps.

S1101. The group header decides to execute a first information report procedure.

In an optional implementation, the group header may be manually set to execute the first information report procedure.

In an optional implementation, the group header detects a current resource conflict probability, and executes the first information report procedure when the resource conflict probability reaches a threshold.

In an optional implementation, when the group header is within a network coverage area of a base station, the base station may configure the group header to execute the first information report procedure.

S1102. The group header sends a first indication message to the group member device, where the first indication message indicates the group member device to report the first information. Descriptions of this step are the same as those in the embodiments of FIG. 7 to FIG. 9. Details are not described herein again.

Descriptions of processing performed after the group member device receives the first indication message are the same as those in the embodiments of FIG. 7 to FIG. 9. Details are not described herein again.

Figure 12:
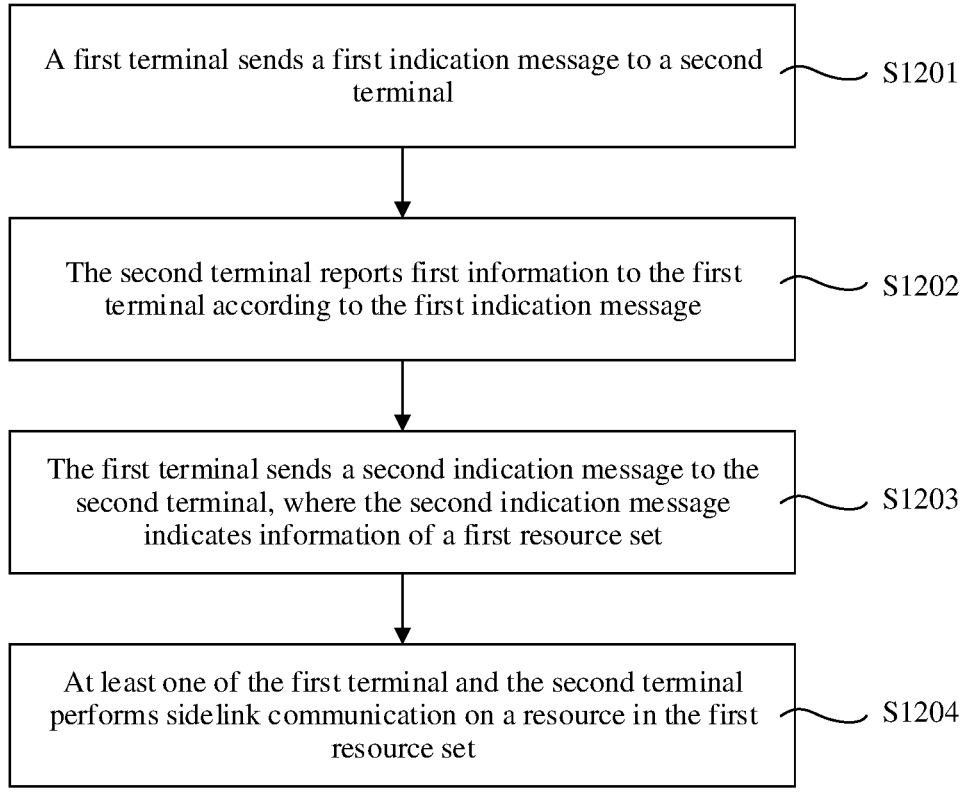
FIG. 12 is a schematic flowchart of another information sending method according to an embodiment of this application.

The following shows an information sending method according to an embodiment of this application. The method is applied to a wireless communication system that includes a first terminal, a second terminal, and a third terminal, where the first terminal and the second terminal belong to a same communication group, the first terminal is a group header, and the second terminal is a group member. As shown in FIG. 12, the method includes the following steps.

S1201. The first terminal sends a first indication message to the second terminal, where the first indication message indicates the second terminal to report first information, and the first indication message includes an indication of a to-be-measure resource set.

S1202. The second terminal reports the first information to the first terminal according to the first indication message, where the first information includes information about interference from the third terminal to a to-be-measured resource in the to-be-measured resources set.

S1203. The first terminal sends a second indication message to the second terminal, where the second indication message indicates information about a first resource set, a resource in the first resource set is a resource for sidelink communication, and the first resource set do not include a resource that is in the to-be-measured resource set and on which interference from the third terminal meets a preset condition.

In an optional implementation, the first resource set does not include a resource that is in the to-be-measured resource set and whose information about interference from the third terminal reaches an interference threshold.

In an optional implementation, the first resource set does not include a resource that is in the to-be-measured resource set and whose information about interference from the third terminal, the second terminal, and the first terminal reaches the interference threshold.

S1204. At least one of the first terminal and the second terminal performs sidelink communication on the resource in the first resource set.

It should be noted that the information sending method provided in FIG. 12 may be implemented in combination with any one of embodiments provided in this application.

The foregoing embodiments of this application may also be applied to other communication system technologies, for example, applied to wireless communication systems using technologies such as Wi-Fi, ZigBee, Bluetooth, and NFC (Near Field Communication, Near Field Communication).

Figure 13:
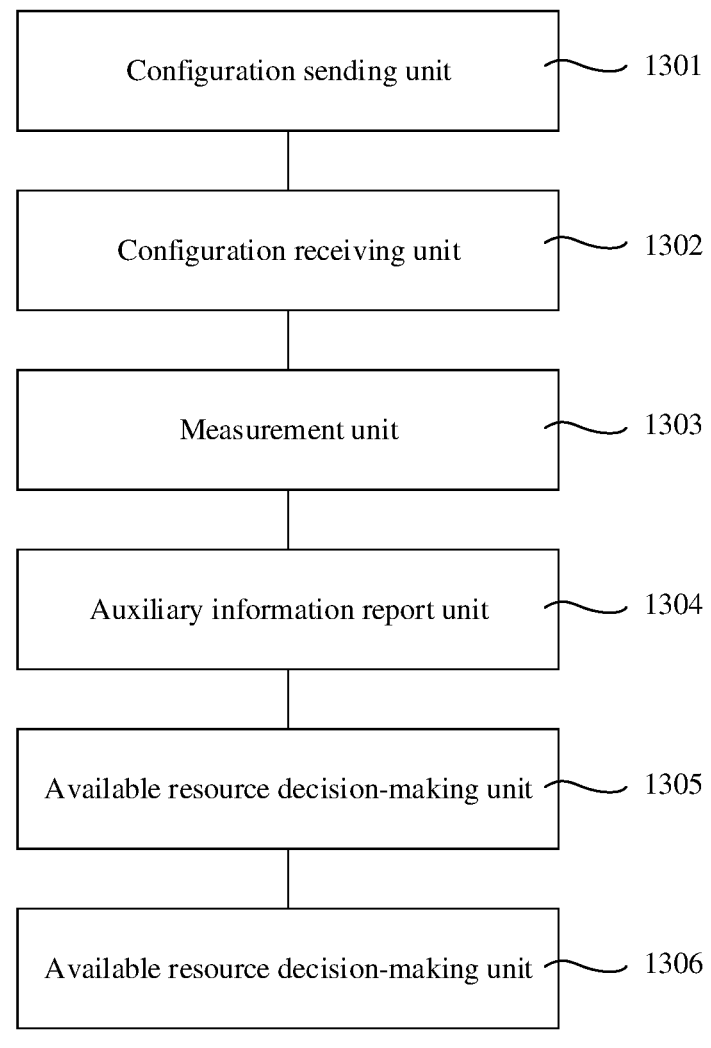
FIG. 13 shows an apparatus for sending information according to an embodiment of this application.

FIG. 13 shows an information sending apparatus according to an embodiment of this application. The apparatus may be implemented as a part of the terminal or the entire terminal in embodiments of this application by using software, hardware, or a combination thereof. The apparatus includes: a configuration sending unit 1301, a configuration receiving unit 1302, a measurement unit 1303, an auxiliary information report unit 1304, an available resource decision-making unit 1305, and an available resource configuration unit 1306.

The configuration sending unit 1301 is configured to send a first indication message to a group member device when the apparatus is used as a group header.

The configuration receiving unit 1302 is configured to: when the apparatus is used as a group member device, receive a first indication message sent by a group header.

The measurement unit 1303 is configured to measure a resource when the apparatus is used as a group member device or a group header.

The auxiliary information report unit 1304 is configured to generate first information and report the first information to a group header when the apparatus is used as a group member device.

The available resource decision-making unit 1305 is configured to: when the apparatus is used as a group header, perform decision-making, based on first information reported by a group member device and measurement information of the apparatus, to obtain a resource for sidelink communication.

The available resource configuration unit 1306 is configured to configure a resource for sidelink communication to a group member device when the apparatus is used as a group header.

Figure 14:
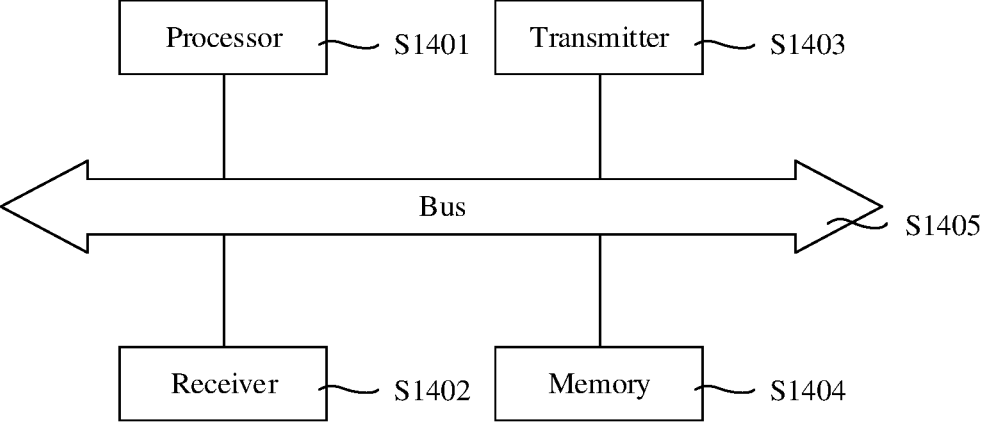
FIG. 14 is a schematic diagram of a structure of a terminal according to an embodiment of this application.

Refer to FIG. 14. FIG. 14 is a schematic diagram of a structure of a terminal according to an embodiment of this application. The terminal includes a processor 1401, a receiver 1402, a transmitter 1403, a memory 1404, and a bus 1405. The processor 1401 includes one or more processing cores. The processor 1401 runs a software program and a module, to execute various functional applications and perform information processing. The receiver 1402 and the transmitter 1403 may be implemented as a communication component, and the communication component may be a baseband chip. The memory 1404 is connected to the processor 1401 by using the bus 1405. The memory 1404 may be configured to store at least one program instruction, and the processor 1401 is configured to execute the at least one program instruction, to implement the technical solutions in the foregoing embodiments. Implementation principles and technical effects thereof are similar to those of the foregoing method embodiments. Details are not described herein again.

After the terminal is powered on, the processor can read a software program in the memory, interpret and execute instructions of the software program, and process data of the software program. When the processor needs to send data (for example, a random access preamble) through an antenna, after performing baseband processing on the to-be-sent data, the processor outputs a baseband signal to a control circuit; and the control circuit performs radio frequency processing on the baseband signal and then sends the radio frequency signal in a form of an electromagnetic wave through the antenna. When data is sent to the terminal, the control circuit receives a radio frequency signal through the antenna, converts the radio frequency signal into the baseband signal, and outputs the baseband signal to the processor. The processor converts the baseband signal into data and processes the data.

Figures 15, 16:
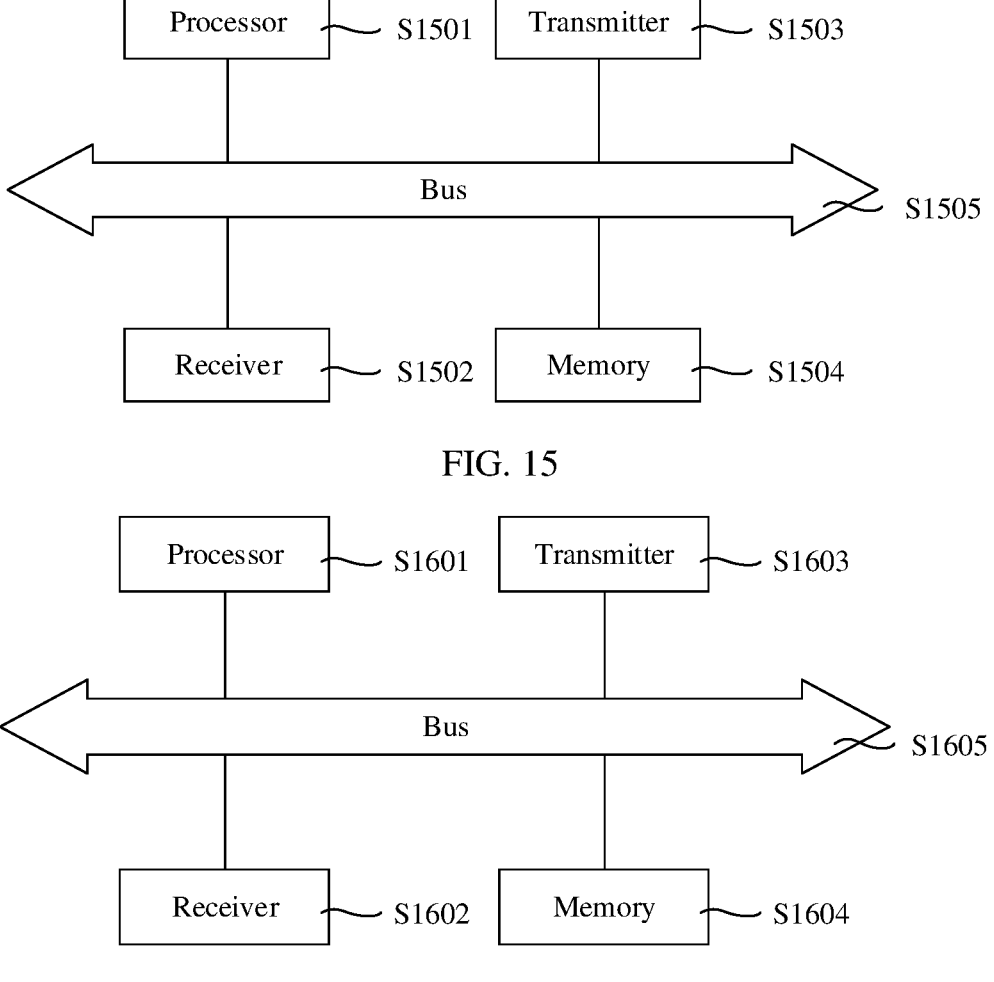
FIG. 15 is a schematic diagram of a structure of a cockpit domain controller system according to an embodiment of this application.
FIG. 16 is a schematic diagram of a structure of a roadside device according to an embodiment of this application.

Refer to FIG. 15. FIG. 15 is a schematic diagram of a structure of a cockpit domain controller system according to an embodiment of this application. The cockpit domain controller system is applied to a vehicle, or this embodiment of this application may be applied to a large smart factory, an unmanned aerial vehicle device, or the like. The cockpit domain controller system includes a processor 1501, a receiver 1502, a transmitter 1503, a memory 1504, and a bus 1505. The processor 1501 runs a software program and a module, to perform application of various functions and information processing. The receiver 1502 and the transmitter 1503 may be implemented as a communication component, and the communication component may be a baseband chip. The memory 1504 is connected to the processor 1501 by using the bus 1505. The memory 1504 may be configured to store at least one program instruction, and the processor 1501 is configured to execute the at least one program instruction, to implement the technical solutions in the foregoing embodiments. Implementation principles and technical effects thereof are similar to those of the foregoing method embodiments. Details are not described herein again.

FIG. 16 is a schematic diagram of a structure of a roadside device according to an embodiment of this application. The roadside device is applied to the Internet of Vehicles. The roadside device includes a processor 1601, a receiver 1602, a transmitter 1603, a memory 1604, and a bus 1605. The processor 1601 runs a software program and a module, to perform application of various functions and information processing. The receiver 1602 and the transmitter 1603 may be implemented as a communication component, and the communication component may be a baseband chip. The memory 1604 is connected to the processor 1601 by using the bus 1605. The memory 1604 may be configured to store at least one program instruction, and the processor 1601 is configured to execute the at least one program instruction, to implement the technical solutions in the foregoing embodiments. Implementation principles and technical effects thereof are similar to those in the foregoing method embodiments, and details are not described herein again.

A person skilled in the art may understand that, for ease of description, only one memory and one processor are shown in FIG. 14 to FIG. 16. In a real terminal, there may be a plurality of processors and memories. The memory may also be referred to as storage medium, storage device, or the like. This is not limited in embodiments of this application.

In an optional implementation, the processor may include a baseband processor and a central processing unit. The baseband processor is mainly configured to process communication data, and the central processing unit is mainly configured to execute a software program and process data of the software program. A person skilled in the art may understand that the baseband processor and the central processing unit may be integrated into one processor, or may be independent processors, and are connected by using a bus or the like. A person skilled in the art may understand that the terminal may include a plurality of baseband processors to adapt to different network standards, the terminal may include a plurality of central processing units to enhance a processing capability, and components of the terminal may be connected by various buses. The baseband processor may also be referred to as baseband processing circuit or baseband processing chip. The central processing unit may also be referred to as central processing circuit or central processing chip. A function of processing communication protocols and communication data may be configured in the processor, or may be stored in the memory in a form of a software program. The processor executes the software program to implement a baseband processing function. The memory may be integrated into the processor, or may be independent of the processor. The memory includes a cache, and may store frequently accessed data/instructions.

In embodiments of this application, the processor may be a general-purpose processor, a digital signal processor, an application-specific integrated circuit, a field-programmable gate array or another programmable logic device, a discrete gate or transistor logic device, or a discrete hardware component, and can implement or perform the methods, steps, and logical block diagrams disclosed in embodiments of this application. The general-purpose processor may be a microprocessor, or may be any conventional processor or the like. The steps in the methods disclosed with reference to embodiments of this application may be directly performed by a hardware processor, or may be performed by a combination of hardware and a software module in the processor.

In embodiments of this application, the memory may be a nonvolatile memory such as a hard disk drive (hard disk drive, HDD) or a solid-state drive (solid-state drive, SSD), or may be a volatile memory (volatile memory) such as a random-access memory (random-access memory, RAM). The memory is any other medium that can carry or store expected program code in a form of an instruction or a data structure and that can be accessed by a computer, but is not limited thereto.

The memory in embodiments of this application may alternatively be a circuit or any other apparatus that can implement a storage function, and is configured to store program instructions and/or data. All or some of the methods provided in embodiments of this application may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedures or functions according to embodiments of this application are all or partially generated. The computer may be a general-purpose computer, a dedicated computer, a computer network, a network device, user equipment, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired manner (for example, a coaxial cable, an optical fiber, or a digital subscriber line (Digital Subscriber Line, DSL)) or a wireless manner (for example, infrared, radio, and microwave). The computer-readable storage medium may be any usable medium accessible by a computer, or a data storage device, such as a server or a data center, integrating one or more usable media. The usable medium may be a magnetic medium (for example, a floppy disk, a hard disk drive, or a magnetic tape), an optical medium (for example, a digital video disc (digital video disc, DVD)), a semiconductor medium (for example, an SSD), or the like.

An embodiment of this application provides a computer program product. When the computer program product is run on a terminal, the terminal is enabled to implement the technical solutions in the foregoing embodiments. Implementation principles and technical effects thereof are similar to those of the foregoing related embodiments, and details are not described herein again.

An embodiment of this application provides a computer-readable storage medium, where the computer-readable storage medium stores program instructions. When the program instructions are executed by a terminal, the terminal is enabled to perform the technical solutions in the foregoing embodiments. Implementation principles and technical effects thereof are similar to those in the foregoing related embodiments, and details are not described herein again. In conclusion, the foregoing embodiments are merely intended for describing the technical solutions of this application, but not for limiting this application. Although this application is described in detail with reference to the foregoing embodiments, a person of ordinary skill in the art should understand that modifications may still be made to the technical solutions described in the foregoing embodiments or equivalent replacements may be made to some technical features thereof, without departing from the scope of the technical solutions of embodiments of this application.

What is claimed is:

1. An information sending method, comprising:
sending, by a first terminal, a first indication message to a second terminal, wherein the first indication message indicates the second terminal to report first information, wherein the first terminal and one or more second terminals are comprised in a wireless communication system;
reporting, by the second terminal, the first information to the first terminal according to the first indication message, wherein the first information indicates channel state information of a channel resource; and
determining, by the first terminal, a second resource set based on second information, wherein the second information is a resource set obtained through measurement performed by the first terminal, wherein the second resource set is determined by the first terminal from a fourth resource set, and wherein one of:
a percentage of resources in the fourth resource set that are measured by the second terminal and whose measurement results reach a measurement threshold is greater than or equal to a first percentage;
a percentage of resources in the fourth resource set that are measured by the first terminal and the second terminal and whose measurement results reach the measurement threshold is greater than or equal to the first percentage; or
the fourth resource set is a set obtained through measurement performed by the first terminal;
determining, by the first terminal, a third resource set based on the first information and the second information, wherein a quantity of resources in the third resource set is a third quantity; and
sending, by the first terminal, a second indication message to the second terminal, wherein the second indication message indicates information about a first resource set, the first resource set is determined by the first terminal based on the first information and comprises the second resource set and the third resource set, and a resource in the first resource set is a resource for sidelink communication.

2. The method according to claim 1, further comprising:
performing, by at least one of the first terminal and the second terminal, sidelink communication on the resource in the first resource set.

3. The method according to claim 1, wherein a channel quality comprises reference signal received power (RSRP), a signal to interference plus noise ratio (SINR), or reference signal received quality (RSRQ), and wherein one of:
the channel state information of a channel resource is first-type state information, and the first-type state information indicates whether the channel quality of the channel resource reaches a first threshold;
the channel state information of a channel resource is second-type state information, and the second-type state information is the channel quality of the channel resource; or
the channel state information of a channel resource is third-type state information, and the third-type state information indicates whether a bit error rate of the channel resource reaches a second threshold.

4. The method according to claim 3, wherein the first indication message comprises an indication of a type of reported content, and the type of reported content is one or more of the first-type state information, the second-type state information, or the third-type state information.

5. The method according to claim 1, wherein, based on a type of reported content being first-type state information or second-type state information, the first information is a resource set obtained through measurement performed by the second terminal, and wherein the third resource set is determined by the first terminal randomly or according to a principle prioritizing traffic volume.

6. The method according to claim 1, wherein, based on a type of reported content being third-type state information, the first information is an interference set obtained through measurement performed by the second terminal, and wherein determining the third resource set by the first terminal comprises at least one of:
the first terminal arranges, based on traffic volumes of second terminals in descending order, interference sets obtained through measurement performed by the second terminals, and selects, according to the arrangement order, resources with a minimum interference in the interference sets as the resources in the third resource set;
the first terminal calculates resource average interference based on the interference set obtained through measurement performed by the second terminal, and selects resources that are of the third quantity and whose resource average interference is the minimum as the resources in the third resource set; or
the first terminal converts a resource interference value into spectral efficiency based on the interference set obtained through measurement performed by the second terminal, obtains a transmission period of a resource through calculation performed based on a traffic volume of the second terminal, and selects resources that are of the third quantity and whose transmission periods are the minimum as the resources in the third resource set.

7. The method according to claim 1, wherein the first indication message comprises an indication of a to-be-measured resource set, and the to-be-measured resource set indicates a position of a channel resource measured by the second terminal.

8. The method according to claim 7, the wireless communication system further comprises a third terminal, the third terminal belongs to another group, and the first information comprises information about interference from the third terminal to a to-be-measured resource in the to-be-measured resource set.

9. The method according to claim 1, wherein the first indication message comprises an indication of a sending mechanism for the first information, and the sending mechanism for the first information comprises reporting the first information on an autonomously selected resource or reporting the first information on a reserved resource.

10. The method according to claim 1, wherein the first indication message comprises an indication of a report occasion, and a type of the report occasion comprises a periodic report or an aperiodic report.

11. The method according to claim 1, wherein sending, by the first terminal, the first indication message to the second terminal comprises:

measuring, by the first terminal, a distance between the first terminal and the second terminal; and sending, by the first terminal, based on the distance reaching a first distance threshold, the first indication message to the second terminal.

12. The method according to claim 1, wherein reporting, by the second terminal, the first information to the first terminal based on the first indication message comprises:

reporting, by the second terminal, the first information to the first terminal based on the first indication message using a radio resource control (RRC) message, a media control element (MCE) message, or a sidelink control indicator (SCI) message.

13. The method according to claim 1, wherein that the first resource set is determined by the first terminal based on the first information comprises:

the first resource set is determined by the first terminal based on the first information and a received available resource state sent by a fourth terminal, wherein the fourth terminal is a group header of another group; or the first resource set is directly determined by the first terminal based on the first information.

14. The method according to claim 1, wherein sending, by the first terminal, the second indication message to the second terminal comprises:

sending, by the first terminal, the second indication message to the second terminal using a radio resource control (RRC) message, a media control element (MCE) message, or a sidelink control indicator (SCI) message.

15. An information sending method, comprising:

sending, by a first terminal in a wireless communication system, a first indication message to a second terminal in the wireless communication system, wherein the first indication message indicates the second terminal to report first information;

receiving, by the first terminal, the first information reported by the second terminal, wherein the first information indicates channel state information of a channel resource;

determining, by the first terminal, a second resource set based on second information, wherein the second information is a resource set obtained through measurement performed by the first terminal, wherein the second resource set is determined by the first terminal from a fourth resource set, and wherein one of:

a percentage of resources in the fourth resource set that are measured by the second terminal and whose measurement results reach a measurement threshold is greater than or equal to a first percentage;

a percentage of resources in the fourth resource set that are measured by the first terminal and the second terminal and whose measurement results reach a measurement threshold is greater than or equal to a first percentage; or the fourth resource set is a set obtained through measurement performed by the first terminal;

determining, by the first terminal, a third resource set based on the first information and the second information, wherein a quantity of resources in the third resource set is a third quantity; and sending, by the first terminal, a second indication message to the second terminal, wherein the second indication message indicates information about a first resource set, the first resource set is determined by the first terminal based on the first information and comprises the second resource set and the third resource set, and a resource in the first resource set is a resource for sidelink communication.

16. The method according to claim 15, wherein a channel quality comprises reference signal received power (RSRP), a signal to interference plus noise ratio (SINR), or reference signal received quality (RSRQ), and one of:

the channel state information of a channel resource is first-type state information, and the first-type state information indicates whether a channel quality of the channel resource reaches a first threshold;

the channel state information of a channel resource is second-type state information, and the second-type state information is the channel quality of the channel resource; or the channel state information of a channel resource is third-type state information, and the third-type state information indicates whether a bit error rate of the channel resource reaches a second threshold.

17. The method according to claim 16, wherein the first indication message comprises an indication of a type of reported content, and wherein the type of reported content is one or more of the first-type state information, the second-type state information, or the third-type state information.

18. The method according to claim 17, wherein, based on the type of reported content being the first-type state information or the second-type state information, the first information is a resource set obtained through measurement performed by the second terminal, and wherein the third resource set is determined by the first terminal randomly or according to a principle prioritizing a traffic volume.

19. The method according to claim 15, wherein that the first resource set is determined by the first terminal based on the first information comprises:

the first resource set is determined by the first terminal based on the first information and a received available resource state sent by a fourth terminal, wherein the fourth terminal is a group header of another group; or the first resource set is directly determined by the first terminal based on the first information.

20. The method according to claim 15, wherein sending, by the first terminal, the second indication message to the second terminal comprises:

sending, by the first terminal, the second indication message to the second terminal using a radio resource control (RRC) message, a media control element (MCE) message, or a sidelink control indicator (SCI) message.

* * * * *